US008365299B2

(12) United States Patent
Sakai et al.

(10) Patent No.: US 8,365,299 B2
(45) Date of Patent: Jan. 29, 2013

(54) INFORMATION PROCESSING DEVICE AND METHOD, RECORDING MEDIUM, AND PROGRAM

(75) Inventors: Yusuke Sakai, Kanagawa (JP); Naoki Saito, Kanagawa (JP); Mikio Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 873 days.

(21) Appl. No.: 11/572,597

(22) PCT Filed: Jul. 20, 2005

(86) PCT No.: PCT/JP2005/013289
§ 371 (c)(1),
(2), (4) Date: Jan. 24, 2007

(87) PCT Pub. No.: WO2006/011398
PCT Pub. Date: Feb. 2, 2006

(65) Prior Publication Data
US 2007/0288993 A1   Dec. 13, 2007

(30) Foreign Application Priority Data
Jul. 27, 2004   (JP) .................................. 2004-218528

(51) Int. Cl.
*H04L 29/06* (2006.01)
(52) U.S. Cl. .............................. 726/27; 705/200; 705/52
(58) Field of Classification Search ........... 380/200–204
See application file for complete search history.

(56) References Cited

U.S. PATENT DOCUMENTS 5,745,879 A * 4/1998 Wyman ........................... 705/1.1
5,926,624 A * 7/1999 Katz et al. ..................... 709/217

(Continued)

FOREIGN PATENT DOCUMENTS
EP   1 161 053    12/2001
EP   1 331 818    7/2003

(Continued)

OTHER PUBLICATIONS

"Personal Multimedia-Multipoint Teleconference System." NTT Laboratories, Japan. pp. 1127-1134. Tanigawa, Hiroya, Arikawa Tomohiko, Masaki Shigeki, and Shimamura Kazunori.

(Continued)

*Primary Examiner* — Edan Orgad
*Assistant Examiner* — Brian Olion
(74) *Attorney, Agent, or Firm* — Oblon, Spivak, McClelland, Maier & Neustadt, L.L.P.

(57) ABSTRACT

The present invention relates to an information processing apparatus and method, a recording medium, and a program which make it possible for persons at remote places to enjoy simultaneous playback of various contents while promoting the protection of the copyright or the privacy. A copyright authentication section 112 decides, based on copyright restriction information added to a content and license information stored in a license storage section 62, whether or not utilization of the content is permitted. An accounting processing section 114 is controlled in response to a result of the decision so that it cooperates with an authentication server to perform an accounting process. A privacy authentication section 115 decides, based on privacy restriction information added to the content and privacy information, whether or not utilization of the content is permitted. A permission request processing section 117 is controlled in response to a result of the decision so that it performs a communication process with a communication apparatus, which has a privacy management right in the content. The present invention can be applied to a communication system which supports remote place communication between users.

13 Claims, 18 Drawing Sheets

U.S. PATENT DOCUMENTS

| | | | |
|---|---|---|---|
| 6,047,322 A * | 4/2000 | Vaid et al. | 709/224 |
| 6,094,675 A * | 7/2000 | Sunaga et al. | 709/204 |
| 6,351,773 B1 * | 2/2002 | Fijolek et al. | 709/228 |
| 2002/0049679 A1 * | 4/2002 | Russell et al. | 705/52 |
| 2002/0194505 A1 * | 12/2002 | Muschenborn | 713/201 |
| 2003/0001978 A1 * | 1/2003 | Smith et al. | 348/714 |
| 2003/0076955 A1 * | 4/2003 | Alve et al. | 380/201 |
| 2003/0081595 A1 * | 5/2003 | Nomura et al. | 370/353 |
| 2004/0024889 A1 | 2/2004 | Getsin et al. | |
| 2005/0071663 A1 * | 3/2005 | Medvinsky et al. | 713/200 |
| 2005/0114896 A1 * | 5/2005 | Hug et al. | 725/88 |
| 2005/0125221 A1 * | 6/2005 | Brown et al. | 704/200.1 |
| 2006/0023949 A1 | 2/2006 | Saito et al. | |
| 2006/0025998 A1 | 2/2006 | Sakai et al. | |
| 2006/0026207 A1 | 2/2006 | Sakai et al. | |
| 2006/0031682 A1 | 2/2006 | Sakai et al. | |

FOREIGN PATENT DOCUMENTS

| | | |
|---|---|---|
| JP | 2001-067794 | 3/2001 |
| JP | 2001-229282 | 8/2001 |
| JP | 2002-247030 | 8/2002 |
| JP | 2003-009105 | 1/2003 |
| JP | 2003-223407 | 8/2003 |
| JP | 2003-224794 | 8/2003 |
| JP | 2003-235018 | 8/2003 |
| JP | 2003-330808 | 11/2003 |
| JP | 2003-337783 | 11/2003 |
| JP | 2004-192451 | 7/2004 |
| WO | WO 03/058965 | 7/2003 |
| WO | WO 2004/038568 | 5/2004 |

OTHER PUBLICATIONS

U.S. Appl. No. 11/133,656.
U.S. Appl. No. 11/572,593, filed Jan. 24, 2007, Saito, et al.
U.S. Appl. No. 11/658,476, filed Jan. 25, 2007, Saito, et al.
U.S. Appl. No. 11/658,833, filed Jan. 29, 2007, Saito, et al.

* cited by examiner

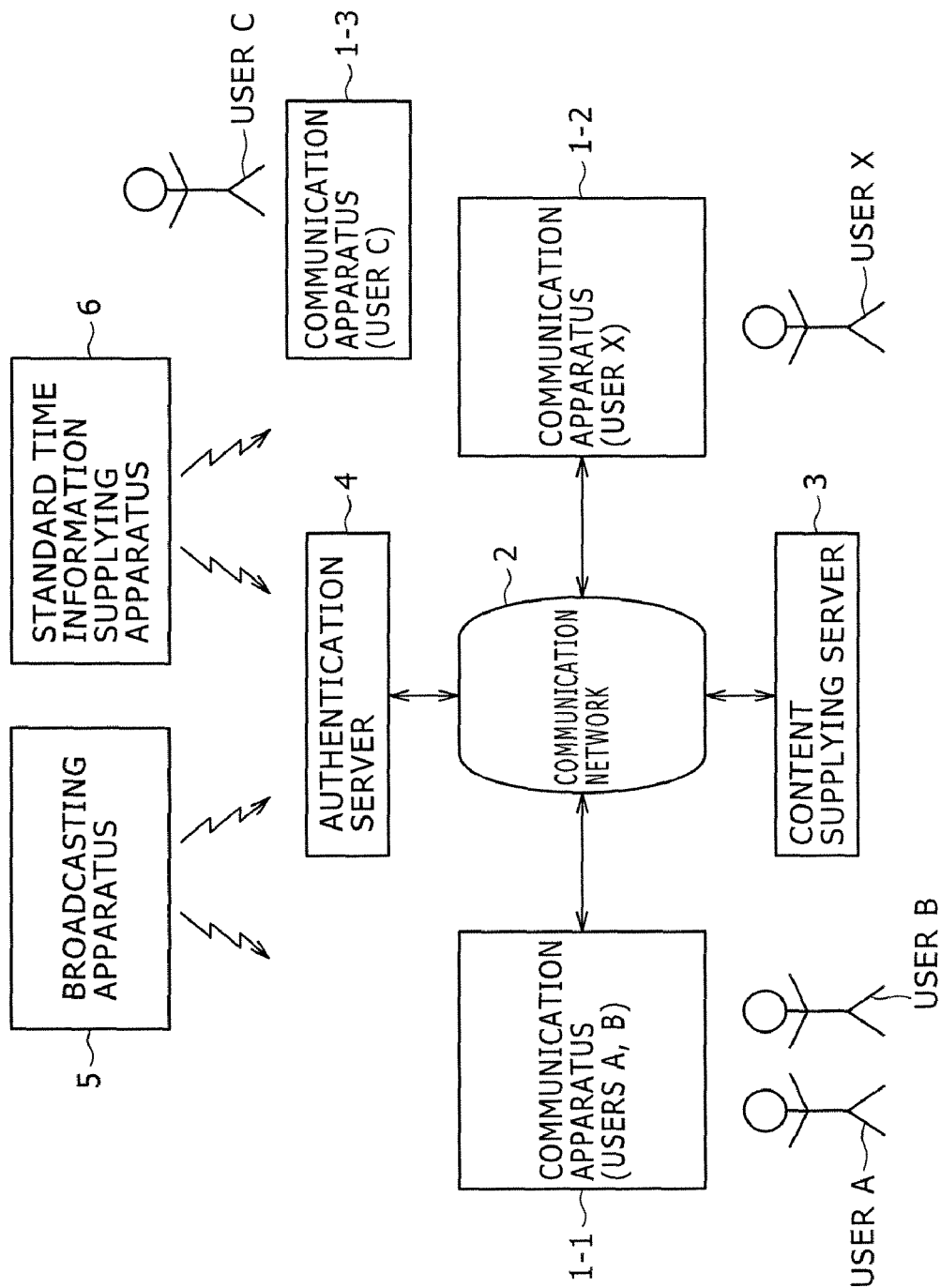

CONTENT IMAGE

IMAGE OF USER A

IMAGE OF USER X

FIG. 7

| LICENSE INFORMATION | VALUE |
|---|---|
| BS / CS BROADCAST | 1 - 11ch / 100 - 210ch |
| DVD CONTENT | DVD 1 (PLAYBACK PERMITTED), DVD 2 (RECORDING PERMITTED) |
| CD CONTENT | CD 1 (PLAYBACK PERMITTED), CD 2 (PLAYBACK PERMITTED), CD 3 (RECORDING PERMITTED) |
| GAME SOFTWARE | GAME 1, GAME 2, GAME 3 |
| PHOTO ALBUM | ALBUM 1, ALBUM 2, ALBUM 3 |
| ... | ... |

FIG. 8

| PRIVACY INFORMATION | VALUE |
|---|---|
| GROUP ATTRIBUTE | GROUP 1, GROUP 2, GROUP 3 |
| PRIVACY LEVEL | LEVEL 2, LEVEL 3, LEVEL 6 |

FIG. 9

| COPYRIGHT RESTRICTION INFORMATION | VALUE | AUTHENTICATION DESTINATION |
|---|---|---|
| PLAYBACK PERMISSION PERIOD | 2004 / 1 ~ | ○○ TV STATION |
| PLAYBACK PERMISSION DISTRICT | TOKYO | ○○ TV STATION |
| PLAYBACK PERMISSION TIME NUMBER | 3 TIMES / TOTALING 10 TIMES | △△ PRODUCTION |
| RECORDING PERMISSION INFORMATION | ○ | △△ PRODUCTION |
| RECORDING TIME NUMBER RESTRICTION | UP TO SECOND GENERATION | △△ PRODUCTION |
| ... | ... | ... |
| PRIVACY RESTRICTION INFORMATION | VALUE | AUTHENTICATION DESTINATION |
| GROUP ATTRIBUTE INFORMATION | GROUP 1 (PLAYBACK PERMITTED), GROUP 3 (RECORDING PERMITTED) | USER C |
| LEVEL RESTRICTION | LEVEL 1 OR MORE | USER C |

FIG.11

| | USER A | USER X |
|---|---|---|
| SYNCHRONOUS PLAYBACK OF SELECTED CONTENT OF USER A | AUTHENTICATED | CONTENT UTILIZATION AUTHENTICATION |
| SYNCHRONOUS PLAYBACK OF SELECTED CONTENT OF USER X | CONTENT UTILIZATION AUTHENTICATION | AUTHENTICATED |
| SYNCHRONOUSLY PLAYED BACK ALREADY BY USER A AND USER X | AUTHENTICATED | AUTHENTICATED |
| SYNCHRONOUSLY PLAYED BACK NEWLY BY USER A AND USER X | CONTENT UTILIZATION AUTHENTICATION | CONTENT UTILIZATION AUTHENTICATION |

FIG.16

| SHARED UTILIZATION RESTRICTION INFORMATION |
|---|
| SHARED TERMINAL NUMBER RESTRICTION INFORMATION |
| SHARING RESTRICTION USER |
| SHARING RESTRICTION DISTRICT |
| SHARING RESTRICTION TIME |
| . . . |

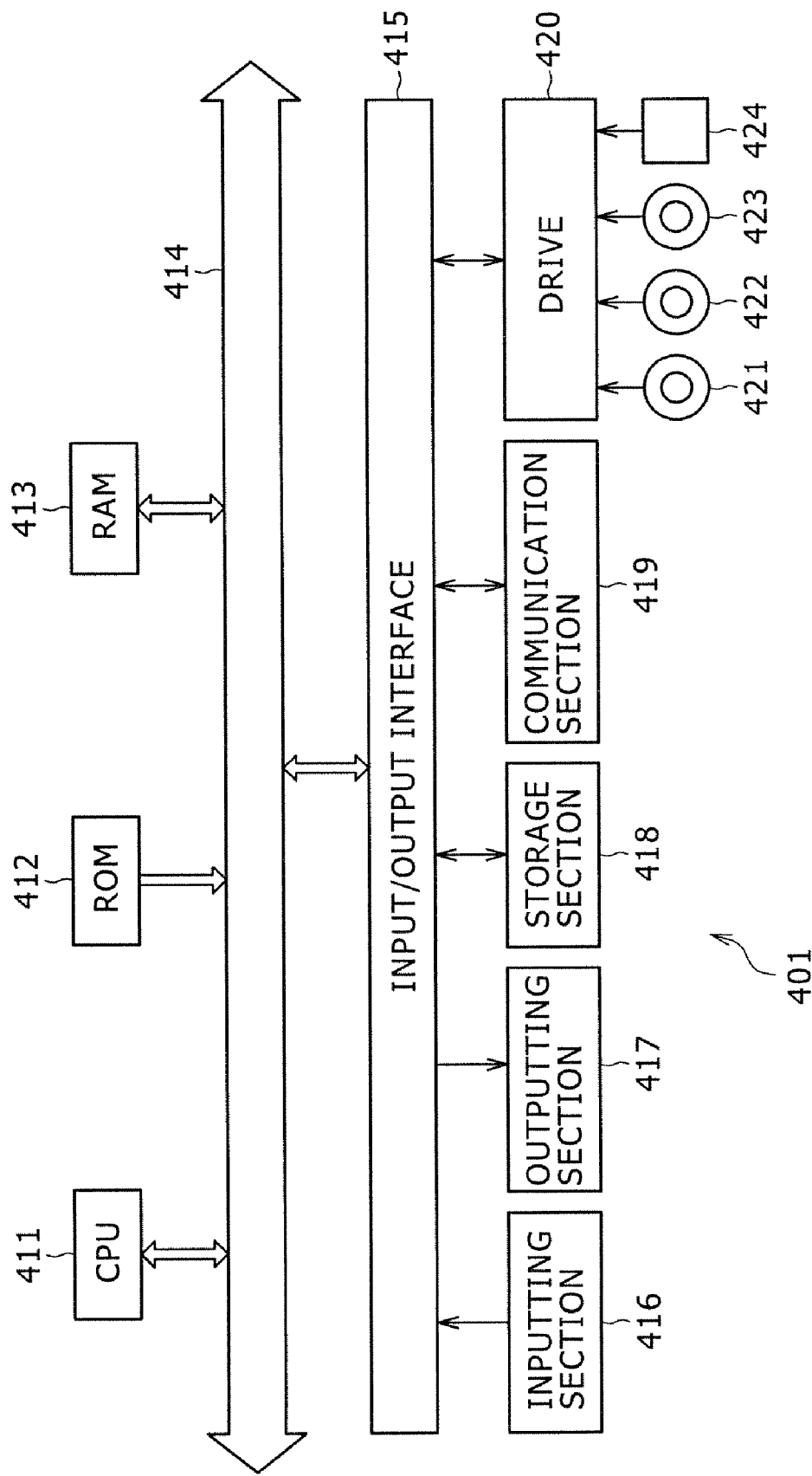

INFORMATION PROCESSING DEVICE AND METHOD, RECORDING MEDIUM, AND PROGRAM

TECHNICAL FIELD

This invention relates to an information processing apparatus and method, a recording medium, and a program, and particularly to an information processing apparatus which synthesizes, in cooperation with a different information processing apparatus connected thereto through a network, the same content and sound and images of individual users of both information processing apparatus such that both information processing apparatus play back the content and the sound and images of the users in synchronism with each other, and an information processing method, a recording medium, and a program.

BACKGROUND ART

Conventionally, as apparatus for use for exchange between persons at remote places (such exchange is hereinafter referred to as remote place communication), a telephone set, a visual telephone set, a video conference system and so forth are available. Also a method wherein a personal computer or the like is used and connected to the Internet to perform text chatting, video chatting which involves an image and sound or the like is available.

Also it has been proposed for persons who try to execute remote place communication to use individual personal computers or the like to share a virtual space or share the same content through the Internet. For example, it is proposed in Patent Document 1 to cooperatively produce a content in a virtual common space in which only authenticated users can participate and share the content.

[Patent Document 1] Japanese Patent Laid-Open No. 2001-229282

DISCLOSURE OF INVENTION

Problem to be Solved by the Invention

However, the conventional method wherein persons at remote places share the same content has a subject that contents which become an object of sharing are limited.

In particular, since conventionally the personal use is restricted to use within a terminal, infringement upon the copyright or privacy is suppressed if a content is used for the purpose of personal enjoyment. However, where the same content is shared by persons at remote places, even if the persons at remote places intend to personally enjoy a content, there is the possibility that use of the content may result in infringement upon the copyright or privacy because the communication is performed through a network.

Therefore, the conventional method has a subject that, where persons at remote places share the same content while the protection of the copyright or privacy is promoted, the content is limited to those contents which can be viewed by all of the users, for example, contents produced in such a common space as described above or contents which do not require protection of the copyright or privacy and are distributed without any charge.

The present invention has been made in view of such a situation as described above, and it is an object of the present invention to make it possible for persons at remote places to view various contents at the same time while the protection of the copyright or privacy is promoted.

Means for Solving the Problem

An information processing apparatus of the present invention includes a first utilization decision section configured to decide based on copyright restriction information added to content data whether or not utilization of the content data is permitted, a second utilization decision section configured to decide based on personal information restriction information added to the content data whether or not utilization of the content data is permitted, and a synchronous playback section configured to play back, when it is decided by the first and second decision sections that utilization of the content data is permitted, the content data in synchronism with a different information processing apparatus by which it is decided based on the copyright restriction information and the personal information restriction information that utilization of the content data is permitted.

The copyright restriction information may include sharing restriction information for restricting synchronous playback of the content data by the synchronous playback section with the different information processing apparatus, and the information processing apparatus may further comprise a sharing authentication decision section configured to decide whether or not synchronous playback of the content data by the synchronous playback section with the different information processing apparatus is to be authenticated based on the sharing restriction information.

The information processing apparatus may further include a notification control section configured to control, where utilization restriction is applied to utilization of the content data which is decided to be permitted by the first utilization decision section based on the copyright restriction information or to utilization of the content data which is decided to be permitted by the second utilization decision section based on the personal information restriction information, notification of the utilization restriction.

The information processing apparatus may further include a recording control section configured to control recording of the content data based on the copyright restriction information and the personal information restriction information.

The information processing apparatus may further include a reception section configured to receive sound and an image of a user from the other information processing apparatus, and a synthesis section configured to synthesize sound and an image of the content data played back in synchronism by the playback section and the sound and the image of the user received by the reception section.

An information processing method of the present invention includes a first utilization decision step of deciding based on copyright restriction information added to content data whether or not utilization of the content data is permitted, a second utilization decision step of deciding based on personal information restriction information added to the content data whether or not utilization of the content data is permitted, and a synchronous playback step of playing back, when it is decided by the processes at the first and second decision steps that utilization of the content data is permitted, the content data in synchronism with a different information processing apparatus by which it is decided based on the copyright restriction information and the personal information restriction information that utilization of the content data is permitted.

A program recorded on a recording medium of the present invention includes a first utilization decision step of deciding based on copyright restriction information added to content data whether or not utilization of the content data is permitted, a second utilization decision step of deciding based on personal information restriction information added to the content data whether or not utilization of the content data is permitted, and a synchronous playback step of playing back, when it is decided by the processes at the first and second decision steps that utilization of the content data is permitted, the content data in synchronism with a different information processing apparatus by which it is decided based on the copyright restriction information and the personal information restriction information that utilization of the content data is permitted.

A program of the present invention includes a first utilization decision step of deciding based on copyright restriction information added to content data whether or not utilization of the content data is permitted, a second utilization decision step of deciding based on personal information restriction information added to the content data whether or not utilization of the content data is permitted, and a synchronous playback step of playing back, when it is decided by the processes at the first and second decision steps that utilization of the content data is permitted, the content data in synchronism with a different information processing apparatus by which it is decided based on the copyright restriction information and the personal information restriction information that utilization of the content data is permitted.

In the present invention, it is decided based on copyright restriction information added to content data whether or not utilization of the content data is permitted, and it is decided based on personal information restriction information added to the content data whether or not utilization of the content data is permitted. Then, if it is decided that utilization of the content data is permitted, then the content data is played back in synchronism by the information processing apparatus with the different information apparatus by which it is decided that utilization of the content is permitted based on the copyright restriction information and the personal information restriction information.

The network is a mechanism wherein at least two apparatus are connected to each other such that information can be transmitted from a certain one of the apparatus to the other one of the apparatus. The apparatus which communicate with each other through the network may be apparatus which are independent of each other or internal blocks which form a single apparatus.

Meanwhile, the communication may be any of wireless communication, wire communication and communication which includes both of wireless communication and wire communication, that is, communication wherein wireless communication is performed in a certain interval and wire communication is performed in another interval. Further, such communication may be used wherein communication from a certain apparatus to another apparatus is performed by wire communication while communication from the latter apparatus to the former apparatus is performed by wireless communication.

Effects of the Invention

According to the present invention, persons at remote places can enjoy simultaneous playback of various contents while the protection of the copyright or the privacy is promoted. Further, according to the present invention, license sale of contents of an object of simultaneous playback is promoted.

BRIEF DESCRIPTION OF DRAWINGS

FIG. 1 is a view showing an example of a configuration of a communication system of the present invention.

FIG. 7 is a view illustrating an example of license information stored in a license storage section 62 of FIG. 4.

FIG. 8 is a view illustrating an example of privacy information stored in a user information storage section 63 of FIG. 4.

FIG. 9 is a view illustrating an example of copyright restriction information and privacy restriction information to be added to a content.

FIG. 11 is a view illustrating an example of selection of a content to be shared.

FIG. 16 is view illustrating an example of shared utilization restriction information.

FIG. 19 is a block diagram showing an example of a configuration of a personal computer to which the present invention is applied.

Figure 2A:
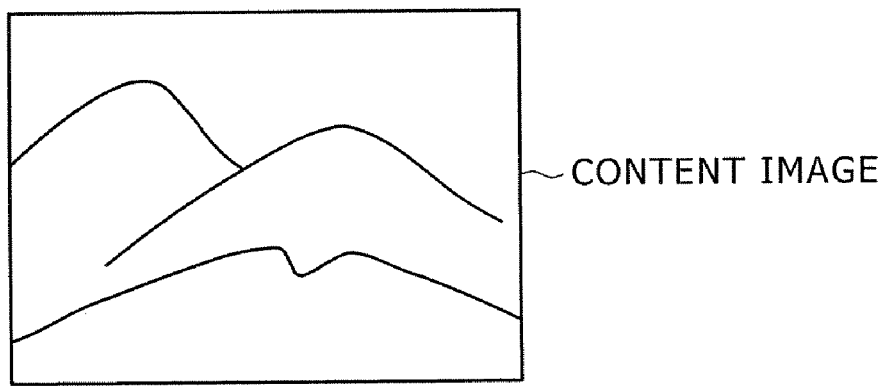
FIG. 2A is a view showing an example of an image used in the communication system of FIG. 1.

DESCRIPTION OF REFERENCE NUMERALS 1-1 to 1-3 communication apparatus, 2 communication network, 3 content supplying server, 4 authentication server, 21 outputting section, 22-1, 22-2 inputting section, 23 communication section, 24 broadcast reception section, 25 content playback section, 27 storage section, 31 operation inputting section, 32 control section, 61 content storage section, 62 license storage section, 63 user information storage section, 81 session management section, 82 viewing recording level setting section, 85 playback permission section, 86 recording permission section, 111 playback authentication control section, 112 copyright authentication section, 114 accounting processing section, 115 privacy authentication section, 117 permission request processing section, 119 content acquisition section, 151 shared utilization authentication section

BEST MODE FOR CARRYING OUT THE INVENTION

In the following, an embodiment of the present invention is described in detail with reference to the drawings.

FIG. 1 shows an example of a configuration of a communication system to which the present invention is applied. In this communication system, a communication apparatus 1-1 establishes a connection to a different communication apparatus 1-2 or 1-3 through a communication network 2 to mutually communicate sound and an image of a user similarly as in the case of a TV (visual) telephone set and besides play back a common content in synchronism with the different communication apparatus 1-2 or 1-3 to support remote place communication between the users. In the following description, where there is no necessity to distinguish the communication apparatus 1-1 to 1-3 from each other, each of them is referred to simply as communication apparatus 1.

It is to be noted that a common content may be, for example, a program content obtained by receiving a television broadcast, a content of a movie or the like downloaded in advance, a private content supplied between users, a content of a game or music or a content recorded on an optical disk 92 (FIG. 4) represented by a DVD (Digital Versatile Disk).

Further, in the present communication system, in order to perform remote place communication, it is necessary for the communication apparatus 1-1 to 1-3 to be registered in the same communication group (which may be hereinafter referred to merely as group). Then, to each of the communication apparatus 1 registered in the group, a privacy level is set in accordance with the intimacy degree. It is to be noted that, although the group and the privacy level may be managed by the authentication server 4 or the like, authentication of a communication apparatus 1 of a manager of the group (in the case of FIG. 1, the communication apparatus 1-3) is required for registration into the group and setting of a privacy level.

Each communication apparatus 1 can be utilized simultaneously by a plurality of users. For example, in the case of FIG. 1, it is assumed that the communication apparatus 1-1 is used by users A and B while the communication apparatus 1-2 is used by a user X and the communication apparatus 1-3 is used by a user C.

Figure 2B:
FIG. 2B is a view showing another example of an image used in the communication system of FIG. 1.
Figure 2C:
FIG. 2C is a view showing a further example of an image used in the communication system of FIG. 1.

For example, it is assumed that the image of the common content is such as shown in FIG. 2A and the image of the user A picked up by the communication apparatus 1-1 is such as shown in FIG. 2B while the image of the user X picked up by the communication apparatus 1-2 is such as shown in FIG. 2C. In this instance, on a display unit 41 (FIG. 4) of the communication apparatus 1-1, the images of the content and the user are displayed in a superposed relationship in accordance with, for example, a picture in picture (picture in picture) mode shown in FIG. 3A, a cross fade (Cross fade) mode shown in FIG. 3B or a wipe (wipe) mode shown in FIG. 3C.

Figure 3A:
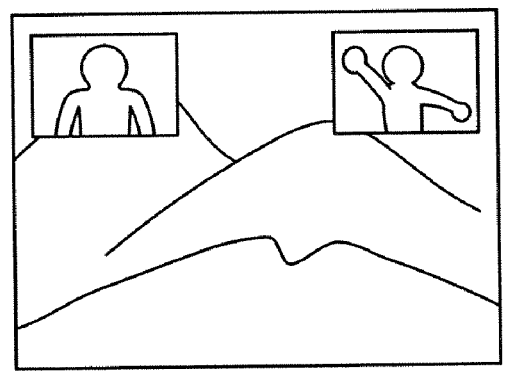
FIG. 3A is a view showing an example of a synthesized pattern of images of a content and images of users.

It is to be noted that, in the picture in picture mode shown in FIG. 3A, the images of the users are superposed as small screens on the image of the content. The display positions and sizes of the small screens can be arbitrarily changed by the users. Also it is possible to display not both of the image of the user itself (user A) and the communication opposite party (user X) but display only one of the small screens.

Figure 3B:
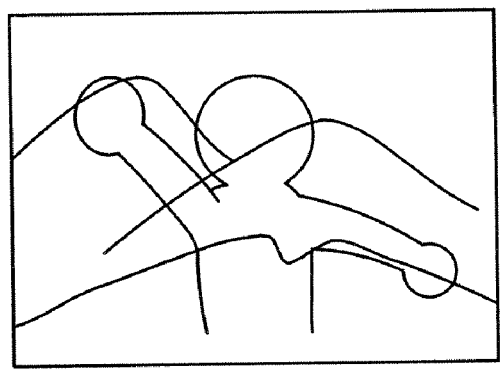
FIG. 3B is a view showing an example of a synthesized pattern of images of the content and an image of a user.

In the cross fade mode shown in FIG. 3B, the image of the content and the image of a user (user A or user X) is displayed in a synthesized state. This cross fade mode can be used, for example, when the user points to an arbitrary position, for example, on a map displayed as the image of the content.

Figure 3C:
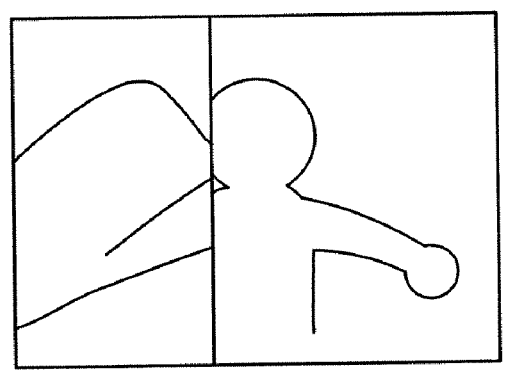
FIG. 3C is a view showing another example of a synthesized pattern of the images of the content and the image of the user.

In the wide mode shown in FIG. 3C, the image of the user appears from a predetermined direction in such a manner that it covers the image of the content. For example, in FIG. 3C, the image of the user appears from the right side of the image of the content.

Figure 4:
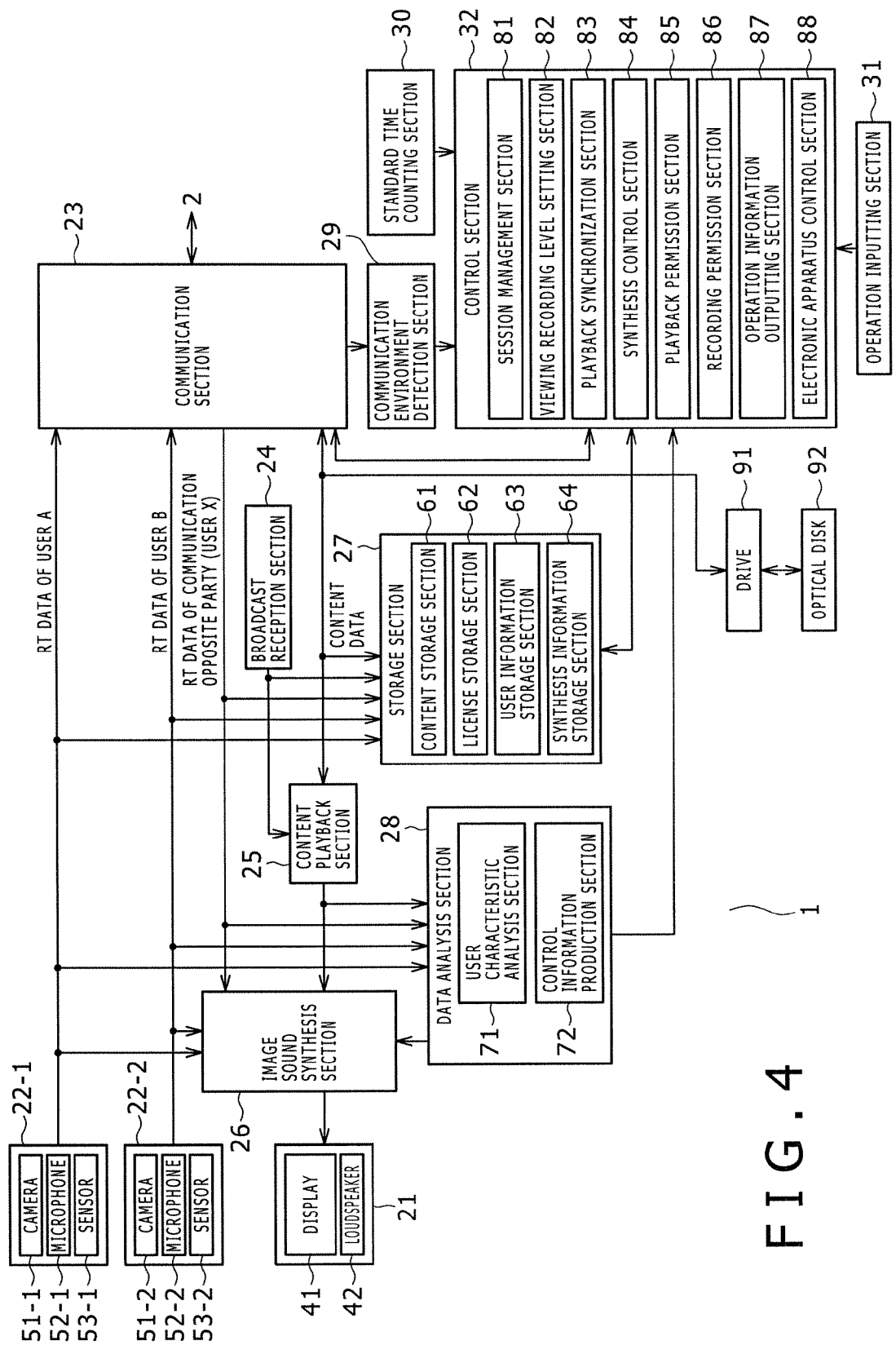
FIG. 4 is a block diagram showing an example of a configuration of a communication apparatus of FIG. 1.

The synthesis patterns can be changed on demand. Also an image balance which sets the transparency of each of the images of the synthesis patterns shown in FIGS. 3A to 3C, though not shown, a sound volume balance which sets the volumes of sound of the content and the users and so forth can be changed on demand as synthesis parameters. A history of change of the synthesis patterns and the synthesis parameters is recorded as synthesis information into a synthesis information storage section 64 (FIG. 4). It is to be noted that display of the images of the content and the users is not limited to the synthesis pattern described above, but any other synthesis pattern may be applied.

Referring back to FIG. 1, the communication network 2 is a broadband data communication network represented by the Internet or the like. A content supplying server 3 supplies a content to a communication apparatus 1 through the communication network 2 in accordance with a request from the communication apparatus 1. An authentication server 4 performs processes for accounting, issuance of license information and so forth when the user of the communication apparatus 1 tries to utilize a content.

A broadcasting apparatus 5 transmits a content as a program of a television broadcast or the like. Accordingly, the individual communication apparatus 1 can receive and play back a content broadcast from the broadcasting apparatus 5 in synchronism with each other. It is to be noted that transmission of a content from the broadcasting apparatus 5 to the communication apparatus 1 may be performed by wireless transmission or by wire transmission. Or, such transmission may be performed through the communication network 2.

A standard time information supplying apparatus 6 supplies standard time information for adjusting clocks (standard time counting section 41 (FIG. 4)) built in the communication apparatus 1 to standard time (world standard time, Japan standard time or the like) to the individual communication apparatus 1. It is to be noted that the supply of standard time information from the standard time information supplying apparatus 6 to the communication apparatus 1 may be performed by wireless communication or by wire communication. Further, the supply may be performed through the communication network 2.

It is to be noted that, while, in the example of FIG. 1, only three communication apparatus 1 are connected through the communication network 2, the number of communication apparatus 1 is not limited to three, but a plurality of communication apparatus 1 are connected to the communication network 2.

Further, in the communication system of FIG. 1, although description is omitted, a predetermined encryption system is used suitably in transmission and reception among the communication apparatus 1, content supplying server 3 and authentication server 4.

Now, an example of a detailed configuration of the communication apparatus 1-1 is described with reference to FIG. 4. It is to be noted that description is given of a case wherein, in FIG. 4, the communication apparatus 1-2 is the opposite party of communication.

In the communication apparatus 1-1, an outputting section 21 is formed from a display unit 41 and a loudspeaker 42, and displays an image and outputs sound corresponding to an image signal and a sound signal inputted thereto from an image sound synthesis section 26.

Inputting sections 22-1 and 22-2 are composed of cameras 51-1 and 51-2 for picking up an image (moving picture or still picture) of the users, microphones 52-1 and 52-2 for collecting sound of the users, and sensors 53-1 and 53-2 for detecting the surrounding brightness, temperature, and so forth of the users, respectively. The inputting sections 22-1 and 22-2 output real-time (RT) data of the user including the acquired image, sound, brightness, temperature and so forth to a communication section 23, a storage section 27 and a data analysis section 28. The inputting sections 22-1 and 22-2 output the acquired image and sound of the users to the image sound synthesis section 26.

It is to be noted that, where there is no necessity to individually distinguish the inputting sections 22-1 and 22-2, cameras 51-1 and 51-2, microphones 52-1 and 52-2 and sensors 53-1 and 53-2, it is referred to merely as inputting section 22, camera 51, microphone 52 and sensor 53, respectively. Further, a plurality of inputting apparatus 22 (in the case of FIG. 24, two inputting apparatus 22) may be provided such that they are directed to a plurality of users (users A and B of FIG. 1).

The communication section 23 transmits real-time data of a user inputted thereto from the inputting section 22 to the communication apparatus 1-2 of the communication opposite party through the communication network 2. Further, the communication section 23 receives real-time data of a user transmitted from the communication apparatus 1-2 and outputs the real-time data to the image sound synthesis section 26 and the storage section 27. Further, the communication section 23 receives a content (hereinafter referred to sometimes as content data) supplied thereto from the communication apparatus 1-2 of the communication opposite party or the content supplying server 3 through the communication network 2 and outputs the content to a content playback section 25 and the storage section 27. Furthermore, the communication section 23 transmits a content stored in the storage section 27 or operation information, control information or the like from an operation information outputting section 87 to the communication apparatus 1-2 through the communication network 2.

A broadcast reception section 24 receives a television broadcast signal broadcast from the broadcasting apparatus 5 and outputs an acquired content of a broadcast program to the content playback section 25. The content playback section 25 plays back the content of the broadcast program received by the broadcast reception section 24, a content received by the communication section 23 or a content read out from the storage section 27 or else a content read out from an optical disk 92 or the like loaded in a drive 91. Further, the content playback section 25 outputs a resulting image and sound of the content to the image sound synthesis section 26 and the data analysis section 28.

The image sound synthesis section 26 mixes (mixes and adjusts; such mixture is hereinafter referred to suitably as synthesis) an image of a content inputted from the content playback section 25, an image and sound of a user inputted from the inputting section 22, an image and sound of the communication opposite party (user X) inputted from the communication section 23 and a character string such as an alert to a user. Then, the image sound synthesis section 26 outputs a resulting image signal and sound signal to the outputting section 21.

The storage section 27 is composed of a content storage section 61, a license storage section 62, a user information storage section 63, and a synthesis information storage section 64. The content storage section 61 stores real-time data of a user (user A or the like) supplied thereto from the inputting section 22, real-time data of the communication opposite party (user X) supplied thereto from the communication section 23, a content of a broadcast program received by the broadcast reception section 24 and a content supplied thereto from the communication section 23. The content has added thereto copyright restriction information relating to the copyright and privacy restriction information relating to the privacy. Details of the copyright restriction information and the privacy restriction information added to the content are hereinafter described.

The license storage section 62 stores license information and so forth which the communication apparatus 1-1 has regarding a content stored in the content storage section 61. The user information storage section 63 stores privacy information of a group to which the communication apparatus 1-1 belongs and a privacy level indicative of the intimacy degree in the group and apparatus information of a district in which the communication apparatus 1-1 is installed and so forth. The synthesis information storage section 64 stores a synthesis pattern and synthesis parameters whose setting is changed by a synthesis control section 84 as synthesis information.

The data analysis section 28 is composed of a user characteristic analysis section 71 and a control information production section 72. To the data analysis section 28, real-time data of a user (user A or the like) supplied thereto from the inputting section 22, real-time data of the communication opposite party (user X) supplied thereto from the communication section 23 and content data from the content playback section 25 are inputted.

The user characteristic analysis section 71 analyzes state information and so forth of the user (user A or the like) obtained from the real-time data of the user supplied thereto from the inputting section 22 and the real-time data of the communication opposite party (user X) supplied thereto from the communication section 23. Then, the user characteristic analysis section 71 outputs a result of the analysis to the control information production section 72. The control information production section 72 produces control information for controlling the image sound synthesis section 26 to synthesize an image and sound of a content from the content playback section 25 and an image and sound of the real time data of the communication opposite party supplied thereto from the communication section 23 in accordance with synthesis parameters and a synthesis pattern based on the result of the analysis. The control information production section 72 outputs the produced control information to the control section 32. It is to be noted that also control information for components of the communication apparatus 1-2 of the communication opposite party is produced and supplied to the operation information outputting section 87.

A communication environment detection section 29 monitors the communication environment (communication rate, communication delay time and so forth) with the communication apparatus 1-2 through the communication section 23 and the communication network 2 and outputs a result of the monitoring to the control section 32. The standard time counting section 30 counts standard time to be supplied to the control section 32. The standard time counting section 30 modifies the standard time counted by the standard time counting section 30 itself based on standard time information supplied thereto from the standard time information supplying apparatus 6. An operation inputting section 31 is formed from a remote controller or the like and accepts an operation of a user and then inputs a corresponding operation signal to the control section 32.

The control section 32 controls the components of the communication apparatus 1-1 based on an operation signal corresponding to an operation of a user inputted from the operation inputting section 31, control information inputted from the data analysis section 28 and so forth. The control section 32 includes a session management section 81, a viewing recording level setting section 82, a playback synchronization section 83, a synthesis control section 84, a playback permission section 85, a recording permission section 86, an operation information outputting section 87 and an electronic apparatus control section 88. It is to be noted that control lines from the control section 32 to the components of the communication apparatus 1-1 are omitted in FIG. 4.

The session management section 81 controls a process by the communication section 23 of establishing a connection to the communication apparatus 1-2 and 1-3, content supplying server 3, authentication server 4 or the like through the communication network 2. When the session management section 81 tries to establish a connection to a different communication apparatus 1, it transmits and receives mutual apparatus information of the communication apparatus 1 (for example, a region in which the communication apparatus 1 is installed, information of a group to which the communication apparatus 1 belongs and so forth). It is to be noted that the session management section 81 of the communication apparatus 1 which manages a communication group performs authentication regarding a request for registration into the communication group from a different communication apparatus 1 and change of the privacy level.

The viewing recording level setting section 82 sets, based on an operation from a user, whether or not real-time data of the user acquired by the inputting section 22 or content data of the personal user stored in the content storage section 61 can be played back or whether or not the real-time data can be recorded in the group to which the communication apparatus 1-2 of the communication opposite party belongs and at the privacy level and, where the real-time data can be recorded, the number of times by which recording is permitted. Then, the viewing recording level setting section 82 adds the setting information as privacy restriction information to real-time data of the user and issues a notification of the resulting setting information from the communication section 23 to the communication apparatus 1-2. It is to be noted that also the privacy restriction information of the communication apparatus 1-2 itself may be set.

The playback synchronization section 83 controls the content playback section 25 so that the same content may be played back in synchronism with the communication apparatus 1-2 of the communication opposite party.

The synthesis control section 84 controls the data analysis section 28 to analyze state information of a user obtained from real-time data of the user in accordance with an operation of the user. Further, the synthesis control section 84 controls the image sound synthesis section 26 so that an image and sound of a content and images and sound of the user may be synthesized in accordance with an operation of the user and control information from the data analysis section 28. In particular, the synthesis control section 84 changes the setting of such a synthesis pattern as seen in FIGS. 3A to 3C and synthesis parameters based on control information from the data analysis section 28. Then, the synthesis control section 84 controls the image sound synthesis section 26 based on the synthesis pattern and the synthesis parameters whose setting is changed. Then, the synthesis control section 84 stores the synthesis pattern and the synthetic parameters, whose setting is changed, as synthesis information into the synthesis information storage section 64.

The playback permission section 85 decides based on license information of a content stored in the license storage section 62 and copyright restriction information added to the content whether or not utilization of the content is permitted. Then, the playback permission section 85 decides whether or not utilization of the content is permitted based on the privacy information stored in the user information storage section 63 and the privacy restriction information added to the content (the privacy restriction information is set, for example, by the viewing recording level setting section 82 of the communication apparatus 1-3 by which the content is produced). Then, the playback permission section 85 controls the content playback section 25 based on a result of the decision.

Further, the playback permission section 85 establishes, as occasion demands, a connection to the content supplying server 3, authentication server 4 or the like through the session management section 81 to acquire license information or a content to update the copyright restriction information. Or, the playback permission section 85 establishes a connection to the communication apparatus 1-3 to update privacy restriction information or privacy information. Or else, the playback permission section 85 controls the image sound synthesis section 26 to cause the display unit 41 to display utilization information (for example, playback time number restriction, whether or not recording is permitted, recording time number restriction or the like) when a content is to be utilized.

The recording permission section 86 decides whether or not recording of a content is permitted based on the copyright restriction information or privacy restriction information added to the content.

The operation information outputting section 87 produces, in response to an operation by a user (a channel changeover operation upon reception of a television broadcast, or an operation for content selection, starting of content playback, ending of playback, fast feeding playback or the like), operation information including the substance of the operation, the time of the operation and so forth. Then, the operation information outputting section 87 issues a notification of the operation information from the communication section 23 to the communication apparatus 1-2 of the communication opposite party. The operation information outputting section 87 further issues a notification of control information from the data analysis section 28 to the communication apparatus 1-2 of the communication opposite party from the communication section 23.

The electronic apparatus control section 88 controls setting of an output and an input of the outputting section 21 and the inputting sections 22 and a predetermined electronic apparatus (for example, a lighting fixture, an air conditioner, or the like; all not shown) positioned around the communication apparatus 1-1 based on an operation by a user and control information inputted from the data analysis section 28.

A drive 91 reads out a content recorded on an optical disk 92 loaded therein and records a content on the optical disk 92. The optical disk 92 is formed from a write once read many type optical disk such as, for example, a DVD (Digital Versatile Disk) ±RW (Re-writable) or a blu-ray disk or an optical disk for playback only such as a CD (Compact Disc) or a DVD with copy control.

It is to be noted that an example of a detailed configuration of the communication apparatus 1-2 and 1-3 is similar to that of the communication apparatus 1-1 shown in FIG. 4, and therefore, description of the same is omitted herein.

Now, a remote communication process with the communication apparatus 1-2 by the communication apparatus 1-1 is described with reference to a flow chart of FIG. 5. It is to be noted that this process is also a process which is similarly executed by the communication apparatus 1-2 as well.

This communication process is started when an operation to instruct starting of remote communication with the communication apparatus 1-2 is inputted to the operation inputting section 31 and an operation signal corresponding to the operation is inputted to the control section 32.

At step S1, the communication section 23 establishes a connection to the communication apparatus 1-2 through the communication network 2 under the control of the session management section 81 and notifies the communication apparatus 1-2 of starting of remote communication. Then, the processing advances to step S2. In response to the notification, the communication apparatus 1-2 returns acceptance of starting of remote communication.

It is to be noted that, at this time, the session management section 81 transmits apparatus information of the communication apparatus 1-1 (for example, a district in which the communication apparatus 1-1 is installed, information of a group to which the communication apparatus 1-1 belongs and so forth) to the communication apparatus 1-2. Corresponding to this, the session management section 81 receives apparatus information from the communication apparatus 1-2 and stores the apparatus information until the remote communication comes to an end.

At step S2, the communication section 23 begins to transmit real-time data of the user A and so forth inputted from the inputting section 22 to the communication apparatus 1-2 through the communication network 2 and starts reception of real-time data of the user X transmitted from the communication apparatus 1-2 under the control of the control section 32. Thereafter, the processing advances to step S3. At this time, real-time data of the real-time data of the user A and so forth inputted from the inputting section 22 and received real-time data of the user X are inputted to the data analysis section 28, and images and sound from within the real-time data are inputted to the image sound synthesis section 26.

At step S3, the playback permission section 85 performs an authentication process for utilizing a content designated by the user (the process is hereinafter referred to as content utilization authentication process). Although details of the content utilization authentication process are hereinafter described, at step S3, playback of a content is permitted based on copyright restriction information and privacy restriction information added to the content, and a notification of completion of preparations for playback of the content is communicated mutually between the communication apparatus 1-1 and the communication apparatus 1-2. Thereafter, the processing advances to step S4.

It is to be noted that, upon playback (viewing), for a content for which the protection of the copyright or privacy is not required (for example, a content being broadcast as a television broadcast), the process at step S3 is unnecessary. However, the process at step S3 is executed also for such a content as just described if the content is stored in the content storage section 61 and played back.

At step S4, the content playback section 25 starts a playback process of the content synchronized with the communication apparatus 1-2 (such playback process is hereinafter referred to as content synchronous playback process) under the control of the playback synchronization section 83. Thereafter, the processing advances to step S5. By the content synchronous playback process, the same content is played back in synchronism by the communication apparatus 1-1 and 1-2 based on standard time information supplied from the standard time counting section 30 (standard time information supplying apparatus 6), and the played back content data are inputted to the image sound synthesis section 26 and the data analysis section 28.

At step S5, the storage section 27 starts a remote communication recording process, whereafter the processing advances to step S6. In particular, the image sound synthesis section 26 synthesizes the content data whose playback is started, images and sound included in real-time data of the user A and so forth inputted and an image and sound included in the received real-time data of the user X under the control of the synthesis control section 84. The image sound synthesis section 26 supplies an image signal and a sound signal obtained as a result of the synthesis to the outputting section 21. It is to be noted that, at this time, the synthesis control section 84 controls the synthesis process of the image sound synthesis section 26 based on a synthesis pattern and synthesis parameters set in advance based on an operation of the user.

The outputting section 21 displays an image corresponding to the image signal supplied thereto and outputs sound corresponding to the sound signal. At this stage, communication of images and sound between the users and synchronous playback of the content are started.

Then, recording of the synthesis information representative of the content data whose playback is started, the images and sound included in real-time data of the user A and so forth inputted, the image and sound included in the received real-time data of the user X and the state of the synthesis (synthesis pattern and synthesis parameters) is started.

At step S6, the data analysis section 28 and the image sound synthesis section 26 execute a user characteristic analysis mixing process by the synthesis control section 84. In particular, at step S6, the data analysis section 28 analyses state information of users (posture information, information of the number of users, sound information, environment information and so forth) and produces control information for controlling the image sound synthesis section 26 and so forth based on a result of the analysis. Accordingly, the synthesis control section 84 does not use the synthesis pattern and the synthesis parameters set in advance in response to an operation of a user but changes the synthesis pattern and the synthesis parameters based on the produced control information and executes a process of controlling the synthesis process of the image sound synthesis section 26.

At step S7, the control section 32 decides whether or not an operation of issuing an instruction to end the remote communication is performed by the user, and waits that it is decided that an operation of issuing an instruction to end the remote communication is performed. When it is decided at step S7 that an operation of issuing an instruction to end the remote communication is performed by the user, the processing advances to step S8.

At step S8, the communication section 23 establishes a connection to the communication apparatus 1-2 through the communication network 2 and issues a notification to end the remote communication to the communication apparatus 1-2 under the control of the session management section 81. In response to the notification, the communication apparatus 1-2 returns acceptance of ending of the remote communication.

At step S9, the storage section 27 ends the communication recording process, and the remote communication process is ended. It is to be noted that the played back content, images and sound included in the real time data of the user A and so forth, image and sound included in the received real-time data of the user X and the synthesis information, which have been recorded till then, are utilized later when the present remote communication is played back.

The description of the remote communication process by the communication apparatus 1-1 is completed therewith.

Now, the content utilization authentication process at step S3 of the remote communication process described hereinabove is described in detail.

Figure 6:
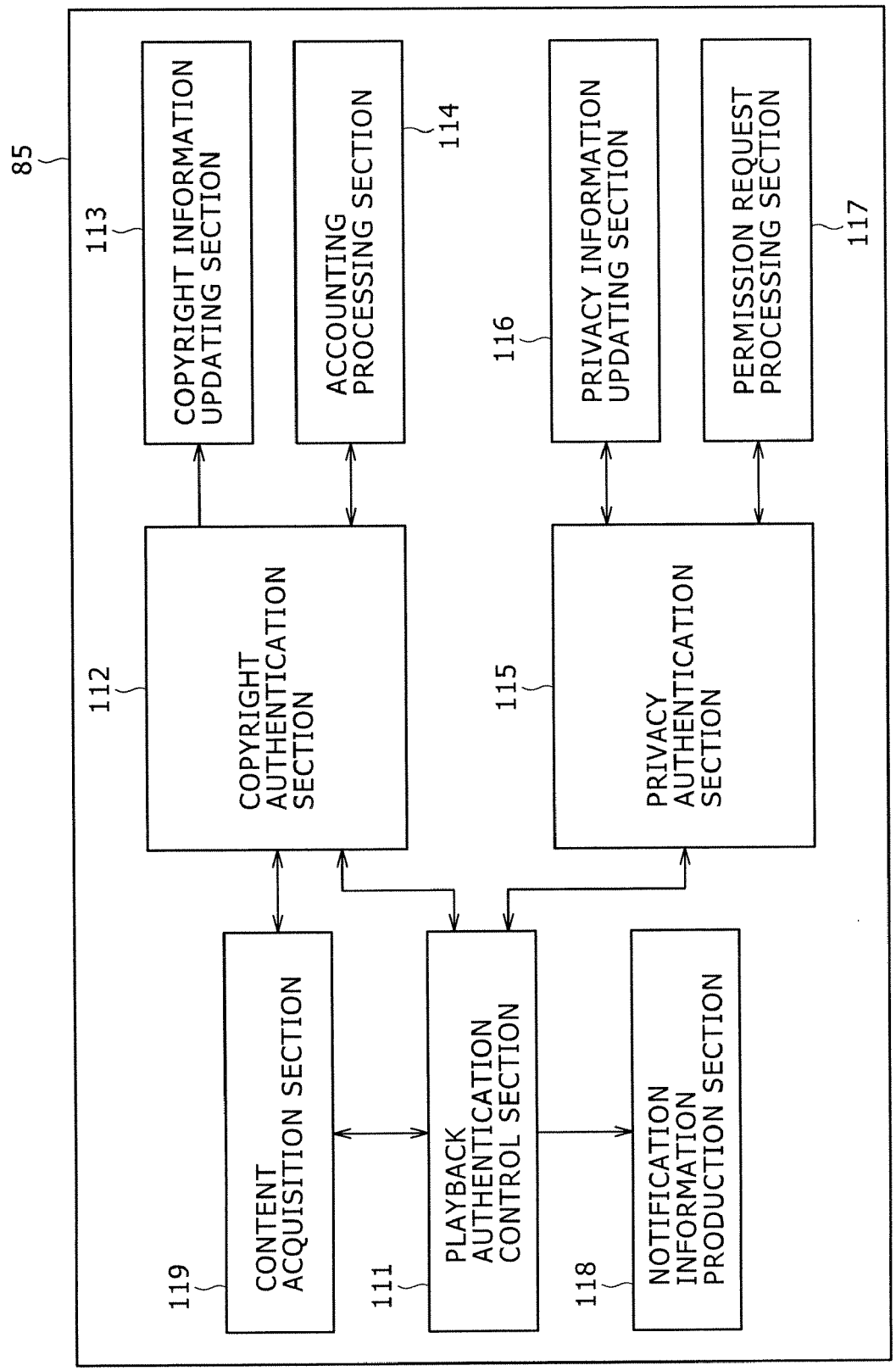
FIG. 6 is a view showing an example of a detailed configuration of a playback permission section of FIG. 4.

FIG. 6 shows an example of a detailed configuration of the playback permission section 85 which performs a content utilization authentication process.

In the example of FIG. 6, the playback permission section 85 includes a playback authentication control section 111, a copyright authentication section 112, a copyright information updating section 113, and an accounting processing section 114. The playback permission section 85 further includes a privacy authentication section 115, a privacy information updating section 116, a permission request processing section 117, a notification information production section 118, and a content acquisition section 119.

The playback authentication control section 111 acquires, when an operation signal for content selection is inputted thereto from the operation inputting section 31, the selected content, and controls the copyright authentication section 112 and the privacy authentication section 115 to execute utilization authentication processes for the selected content. In particular, if the selected content is one of contents acquired already and stored in the storage section 27 or one of contents recorded on the optical disk 92, then the playback authentication control section 111 controls the storage section 27 and the drive 91 to read out and supply the content to the content playback section 25. On the other hand, if the selected content is one of contents of the content supplying server 3, then the playback authentication control section 111 controls the content acquisition section 119 to execute a content acquisition process.

Further, the playback authentication control section 111 controls the session management section 81 in response to results of the authentication from the copyright authentication section 112 and the privacy authentication section 115 to mutually communicate a completion notification of preparations for content playback with the communication apparatus 1-2 and permit the content playback section 25 to permit playback of the content. Or, the playback authentication control section 111 controls the notification information production section 118 to produce a notification of utilization restriction of the content from the copyright authentication section 112 and the privacy authentication section 115.

The copyright authentication section 112 decides whether or not utilization of a content supplied thereto from the content playback section 25 is permitted based on the copyright restriction information added to the content and the license information which is stored in the license storage section 62 and which the communication apparatus 1-1 has. Then, the copyright authentication section 112 controls the accounting processing section 114 and the copyright information updating section 113 in response to a result of the decision to cooperate with the authentication server 4 to perform an accounting process or supply utilization restriction of the content to the notification information production section 118 through the playback authentication control section 111.

The copyright information updating section 113 acquires new copyright restriction information from the authentication server 4 through the communication section 23 as a result of the accounting process by the accounting processing section 114 and updates the copyright restriction information added to the content with the acquired copyright restriction information. It is to be noted that, if new license information is acquired as a result of the accounting process by the accounting processing section 114, then the copyright information updating section 113 updates also the license information of the license storage section 62.

The accounting processing section 114 controls the session management section 81 to establish a connection to the authentication server 4 and performs updating of the copyright restriction information of the content or an accounting process regarding acquisition of the license information.

The privacy authentication section 115 decides, based on privacy restriction information added to a content supplied to the content playback section 25 and the privacy information stored in the synthesis information storage section 64, whether or not utilization of the content should be permitted. Then, the privacy authentication section 115 controls the permission request processing section 117 and the privacy information updating section 116 in response to a result of the decision to perform a communication process with the communication apparatus 1-3 of the user C which has the privacy management right on the content to be played back or supply utilization restriction of the content to the notification information production section 118 through the playback authentication control section 111.

The privacy information updating section 116 acquires new privacy restriction information from the communication apparatus 1-3 through the communication section 23 as a result of the requesting process by the permission request processing section 117 and updates the privacy restriction information added to the content with the acquired privacy restriction information. It is to be noted that, if new privacy information is acquired as a result of the requesting process by the permission request processing section 117, then the privacy information updating section 116 updates also the privacy information of the user information storage section 63.

The permission request processing section 117 controls the session management section 81 to establish a connection to the communication apparatus 1-3 and performs updating of the privacy restriction information of a content or a requesting process for acquisition of privacy information.

The notification information production section 118 produces an image for the notification of utilization restriction supplied from the copyright authentication section 112 or the privacy authentication section 115 and supplies the produced image to the image sound synthesis section 26.

The content acquisition section 119 controls the session management section 81 to establish a connection to the content supplying server 3 and executes a content acquisition process using the license information of the license storage section 62 and the privacy information of the user information storage section 63. It is to be noted that, if the license information corresponding to the content to be acquired is not available, then the content acquisition section 119 controls the copyright authentication section 112 to acquire license information for the content to be acquired.

FIG. 7 illustrates an example of the license information stored in the license storage section 62.

In the example of FIG. 7, license information for BS (Broadcasting Satellite)/CS (Communication Satellite) broadcasting, a DVD content, a CD content, game software, a photo album and so forth, which the communication apparatus 1-1 has, is listed.

In particular, the communication apparatus 1-1 has license information which permits viewing of 1 to 11 ch (channels) of BS broadcasting and license information which permits viewing of 100 to 210 ch (channels) of CS broadcasting.

The communication apparatus 1-1 has, as the license information regarding a DVD content, license information which permits playback of a content having the title name of DVD 1 and license information which permits recording of a content having the title name of DVD 2. It is to be noted that, in FIG. 7, the DVD content represents an image (moving picture) content and includes not only a content recorded on the optical disk 92 formed from a DVD but also a content downloaded from the content supplying server 3.

The communication apparatus 1-1 has license information which permits playback of a content having the title name of CD 1, license information which permits playback of another content having the title name of CD 2 and license information which permits recording of a further content having the title name of CD 3. It is to be noted that the CD content represents a content of music and includes not only a content recorded on the optical disk 92 formed from a CD but also a content downloaded from the content supplying server 3.

The communication apparatus 1-1 has license information which permits playback (play) of game software contents having the title names of game 1, game 2 and game 3.

The communication apparatus 1-1 has license information which permits playback of contents of photo albums (still picture albums) having the title names of album 1, album 2 and album 3. It is to be noted that also contents of game software and a photo album may be recorded on and distributed together with the optical disk 92 or may be downloaded from the content supplying server 3 and distributed.

Accordingly, each of contents of an object of the license information can be utilized in accordance with the copyright restriction information added to the content by the communication apparatus 1-1.

FIG. 8 illustrates an example of the privacy information stored in the user information storage section 63.

The privacy information includes a group attribute which is information of a communication group to which the communication apparatus 1-1 belongs and within which remote place communication is performed, and a privacy level set in response to the intimacy degree in each group. The privacy level represents the intimacy degree such that, as the numerical value thereof decreases, the intimacy degree increases.

In the example of FIG. 8, the communication apparatus 1-1 belongs to a communication group named group 1, and the privacy level is set as privacy level 2 in the group 1. Further, the communication apparatus 1-1 belongs to another communication group named group 2, in which the privacy level is set as privacy level 3. Furthermore, the communication apparatus 1-1 belongs to a further communication group named group 3, in which the privacy level is set as privacy level 6.

Accordingly, by comparing the privacy information with the privacy restriction information included in a content, the communication apparatus 1-1 can utilize the content.

It is to be noted that setting of the privacy information can be changed if authentication of a communication apparatus 1 of a manager of a group (for example, the communication apparatus 1-3) is obtained.

FIG. 9 illustrates an example of the copyright restriction information and the privacy restriction information to be added to a content.

In the example of FIG. 9, the privacy restriction information includes a playback permission period, a playback permission district, a playback permission time number, recording permission information and recording time number restriction. It is to be noted that this configuration of the copyright restriction information is an example and differs depending upon a content to which the copyright restriction information is to be added.

In particular, copyright restriction information wherein the playback permission period is "in or later than January, 2004" and the authentication destination is a "∘∘ TV station" and copyright restriction information wherein the playback permission district is "Tokyo" and the authentication destination is "∘∘ TV station" are examples of the copyright restriction information to be added to a content of a television broadcast.

A content to which such copyright restriction information as described above is added is, for example, that which is broadcast only in Tokyo on the last day of December 2003, and even if a user of the communication apparatus 1-1 acquires this content from the content supplying server 3 or the like prior to the playback permission period (in or later than January, 2004), the content cannot be played back. Further, even if the communication apparatus 1-2 receives and stores the content in Tokyo on the last day of December, 2003 and transmits the content to the communication apparatus 1-1, if the communication apparatus 1-1 is installed at a place other than Tokyo, then the communication apparatus 1-1 cannot play back the content even in or later than January, 2004.

Accordingly, if it is intended to utilize a content on the communication apparatus 1-1 installed at a place other than Tokyo, then it is necessary to perform an accounting process together with the ∘∘ TV station (for example, the authentication server 4) to acquire license information which permits playback of the content.

In this manner, if it is intended to use the communication apparatus 1-1 to perform synchronous playback of a content, which is broadcast by the broadcasting apparatus 5 and is received by the broadcast reception section 24 of the communication apparatus 1-1 and stored in the content storage section 61, on the communication apparatus 1-2, then the content cannot be played back by the communication apparatus 1-2 side because of the copyright restriction information. Thus, an authentication process for the copyright restriction information is required.

On the other hand, copyright restriction information wherein the playback permission time number is "three times/totaling 10 times" and the authentication destination is a "ΔΔ production", copyright restriction information wherein the recording permission information is "∘" and the authentication destination is the "ΔΔ production", and copyright restriction information wherein the recording permission time number restriction is "up to second generation" and the authentication destination is the "ΔΔ production" are examples of the copyright restriction information to be added, for example, to a DVD content recorded on the optical disk 92.

Although a content to which such copyright restriction information as described above is added can be played back (utilized) by the communication apparatus 1-1 which has the license information, the playback is restricted. In particular, in the case of the example of FIG. 9, since the content has been played back three times from within 10 times by the communication apparatus 1-1, the communication apparatus 1-1 can reproduce the content later only by seven times. Further, recording (duplication) of the content is permitted only up to the second generation. Accordingly, although it is possible to duplicate the content (first generation) to obtain (record) another content (second generation), it is not permitted to further duplicate the content (second generation) itself to obtain a further content (third generation).

Accordingly, when the user wants to play back the content on the communication apparatus 1-1 after the content is further played back by seven times, it is necessary for the user to perform an accounting process with the "ΔΔ production" (for example, the authentication server 4) to acquire copyright restriction information updated so that the content can be played back further by a plural number of times (for example, 10 times). Similarly, when the user wants to duplicate a content duplicated once by one more generation on the communication apparatus 1-1, it is necessary for the user to perform an accounting process with the "ΔΔ production" (for example, the authentication server 4) to acquire copyright restriction information updated so that the recording time number restriction of the content is to the third generation.

The privacy restriction information of the example of FIG. 9 includes group attribute restriction and level restriction.

The authentication destination of the privacy restriction information wherein the group attribute restriction is "group 1 (playback permitted), group 3 (recording permitted)" and the privacy restriction information wherein the level restriction is "level 1 or more" is the "user C". In other words, the privacy restriction information is added, for example, to a content of an individual produced by the user C and managed by the viewing recording level setting section 82 of the communication apparatus 1-3 of the user C.

Describing more particularly, for example, if the group 1 is a "family", then the level differs among different members of the family depending upon the intimacy degree. Thus, it is assumed that the level is set such that the "parents" have the level 1 and are highest in the intimacy degree while an "elder sister" has the level 2 and is lower in the intimacy degree. In this instance, if the group attribute information in the privacy restriction information with regard to a certain content is set such that the group 1 is "family" and the level restriction is "level 1 or more", then those who are permitted to reproduce the content are limited to the "parents" of the level 1 while the "elder sister" whose level is 2 is excepted.

By providing the concept of the privacy level in this manner, it is possible to filter registered members in a group in accordance with the intimacy degree.

Accordingly, if a user of the communication apparatus 1-1 who belongs to the group 1 and has the level 2 and to whom playback is not permitted wants to play back the content, then it is necessary for the communication apparatus 1-1 to issue a request to the communication apparatus 1-3 of the user C who manages the privacy restriction information of the content to obtain privacy restriction information updated so that the content can be played back by the user who has the level 2 or more.

It is to be noted that the communication apparatus 1-1 may issue a request to the communication apparatus 1-3 of the user C to set the level of the privacy information of the communication apparatus 1-1 itself higher so that playback of the content by the communication apparatus 1-1 may be permitted.

The content of the individual produced by the user C described above includes real-time data of the user X communicated at step S2. In other words, since also the real-time data may be read out by the user A again or distributed to the different user C after it is stored into the content storage section 61, privacy restriction information can be added.

Furthermore, although details are hereinafter described, when the content supplying server 3 supplies a content, if a request for privacy information is issued to a user who supplies the content, then the privacy restriction information can be added also to the content supplied from the content supplying server 3.

Figure 5:
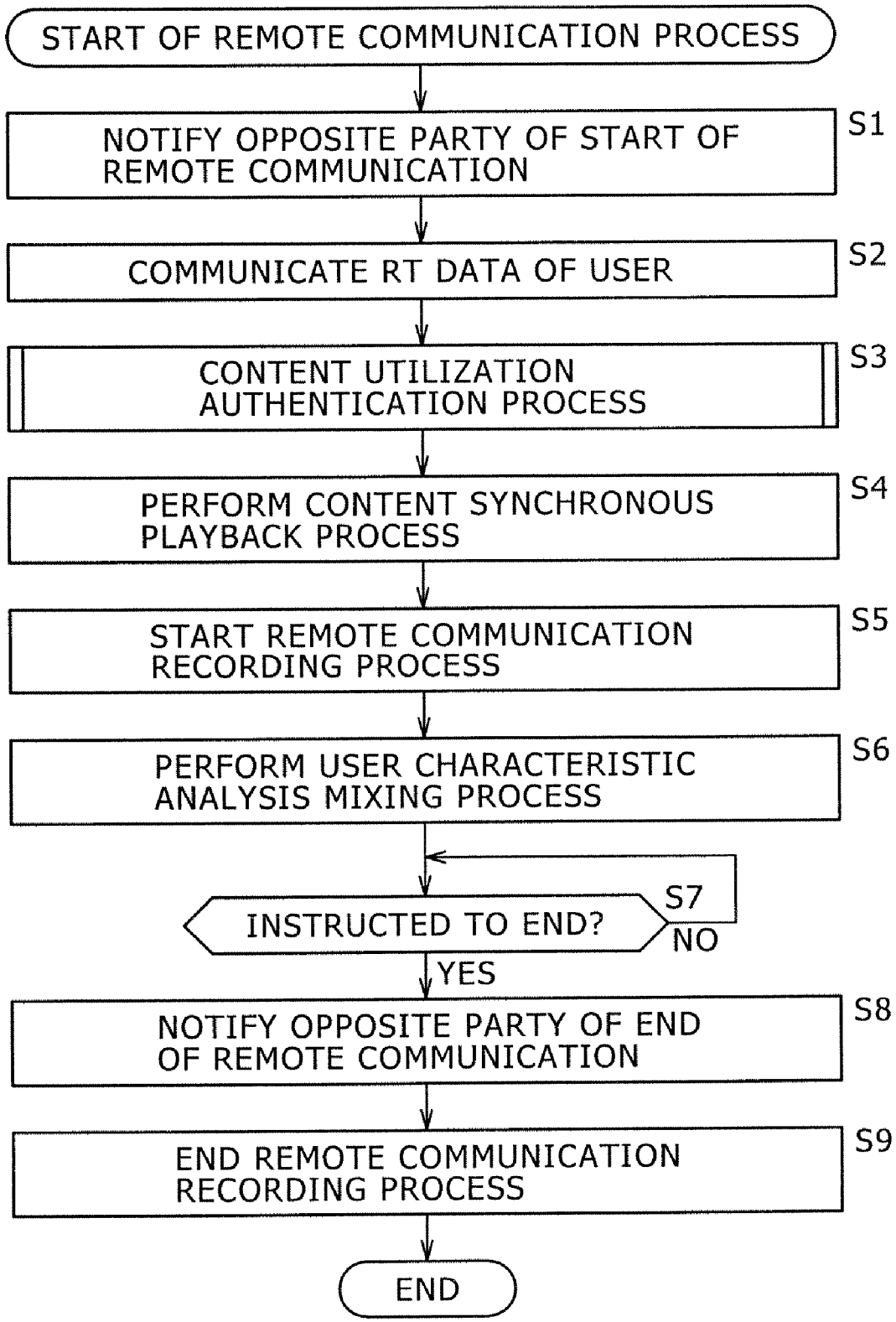
FIG. 5 is a flow chart illustrating a remote communication process of the communication apparatus of FIG. 1.

Now, the content utilization authentication process at step S3 of FIG. 5 is described with reference to a flow chart of FIG. 10.

An operation for issuing an instruction to select an object content to be played back in synchronism with the communication apparatus 1-2 is performed by the user A using the operation inputting section 31. The operation inputting section 31 supplies an operation signal corresponding to the operation by the user A to the playback authentication control section 111.

Based on an operation by the user X corresponding to the operation by the user A, also in the communication apparatus 1-2, the content utilization authentication process (that is, a process for authenticating playback of the content) is executed. It is to be noted that, at this time, the operation signal corresponding to the operation by the user A from the operation inputting section 31 may be supplied to the operation information outputting section 87 so as to issue a notification from the communication section 23 to the communication apparatus 1-2 of the communication opposite party so that the object content may be selected in the communication apparatus 1-2.

The playback authentication control section 111 waits at step S21 that an object content is selected. Then, if it is decided that the object content is selected in response to an operation signal from the operation inputting section 31, then the processing advances to step S22, at which the playback authentication control section 111 decides whether or not the selected content is acquired already.

For example, if the selected content is a content of the content supplying server 3, then it is decided at step S22 that the selected content is not acquired as yet, and the processing advances to step S23, at which the playback authentication control section 111 controls the content acquisition section 119 to execute a content acquisition process. While the content acquisition process is hereinafter described with reference to FIG. 14, by the process at step S23, acquisition of the content by the communication apparatus 1-1 is permitted by the content supplying server 3 and reception of the content from the content supplying server 3 is started. Then, the received content is supplied to the content playback section 25, and the processing advances to step S24.

It is to be noted that, while details are hereinafter described with reference to FIG. 15, copyright restriction information and privacy restriction information are added to the received content. Accordingly, in later processes, the authentication process is executed for the received content similarly for the other contents.

On the other hand, for example, if the selected content is acquired already and is stored in the content storage section 61 or recorded on the optical disk 92, then it is decided at step S22 that the selected content is acquired already. Then, the playback authentication control section 111 controls the content storage section 61 or the drive 91 to read out and supply the stored content to the content playback section 25. Thereafter, the processing skips the step S23 and advances to step S24.

At step S24, the playback authentication control section 111 controls the copyright authentication section 112 to execute a copyright authentication process for the content supplied to content playback section 25. It is to be noted that, while the copyright authentication process is hereinafter described with reference to FIG. 12, utilization of the content in terms of the copyright is authenticated by the process at step S24, and then the processing advances to step S25.

Further, at step S25, the playback authentication control section 111 controls the privacy authentication section 115 to execute a privacy authentication process for the content supplied to the content playback section 25. It is to be noted that, while the privacy authentication process is hereinafter described with reference to FIG. 13, utilization of the content in terms of the privacy is authenticated by the process at step S25, and then the processing advances to step S26.

At step S26, the playback authentication control section 111 issues and receives a notification of completion of preparations for content playback to and from the communication apparatus 1-2 in response to a result of the authentication for utilization of the content by the copyright authentication section 112 or the privacy authentication section 115.

Since playback by the content playback section 25 is permitted therewith, the content utilization authentication process is ended. Thereafter, the processing returns to step S3 of FIG. 5 and then advances to step S4, at which the content playback section 25 can start a playback process of the content synchronized with the communication apparatus 1-2 under the control by the playback synchronization section 83.

It is to be noted that, where the content is a content acquired already and stored in the content storage section 61 or a content recorded on the optical disk 92, the processes at steps S24 and S25 may be executed before it is read out and supplied to the content playback section 25.

Further, while a case is described in connection with the example of FIG. 10 wherein, when both the user A of the communication apparatus 1-1 and the user X of the communication apparatus 1-2 select an object content and execute synchronous playback newly, both of the communication apparatus 1-1 of the user A and the communication apparatus 1-2 of the user X execute the content utilization authentication process of FIG. 10 (fourth case from above in FIG. 11), the user A and the user X select an object content after remote communication is started at step S1 of FIG. 5 and mutual real time data thereof are communicated with each other at step S2. Accordingly, there is the possibility that the content selected at this time may be played back already by the user as seen in FIG. 11.

For example, if a content selected and played back already by the user A is to be played back in synchronism, utilization of the content is authenticated already by the communication apparatus 1-1 of the user A. Accordingly, in this instance, the content utilization authentication process is executed only by the communication apparatus 1-2 of the user X at step S3 of FIG. 5.

Where a content selected and played back already by the user X is to be played back in synchronism, utilization of the content is authenticated already by the communication apparatus 1-2 of the user X. Accordingly, in this instance, the content utilization authentication process is executed only by the communication apparatus 1-1 of the user A at step S3 of FIG. 5.

Further, where a content selected and played back already by the user A and user X is to be played back in synchronism, utilization of the content is authenticated already by the communication apparatus 1-1 of the user A and the communication apparatus 1-2 of the user X. Accordingly, the content utilization authentication process at step S3 of FIG. 5 need not be performed and therefore is skipped.

Then, if both of the user A and user X select an object content and newly reproduce the object content in synchronism with each other, as described hereinabove with reference to FIG. 10, the content utilization authentication process is executed by both of the communication apparatus 1-1 of the user A and the communication apparatus 1-2 of the user X.

Figure 10:
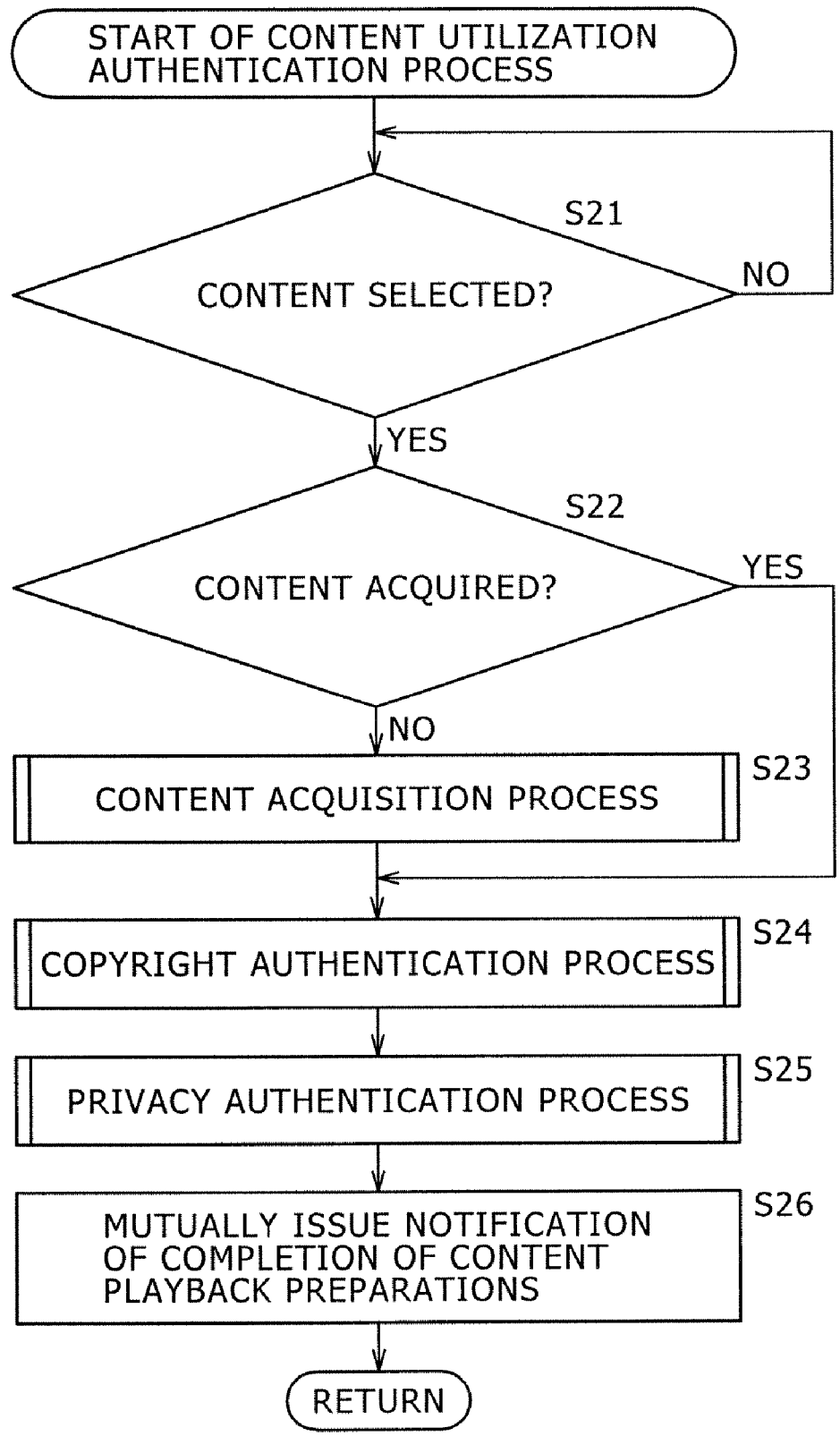
FIG. 10 is a flow chart illustrating a content utilization authentication process at step S3 of FIG. 5.
Figure 12:
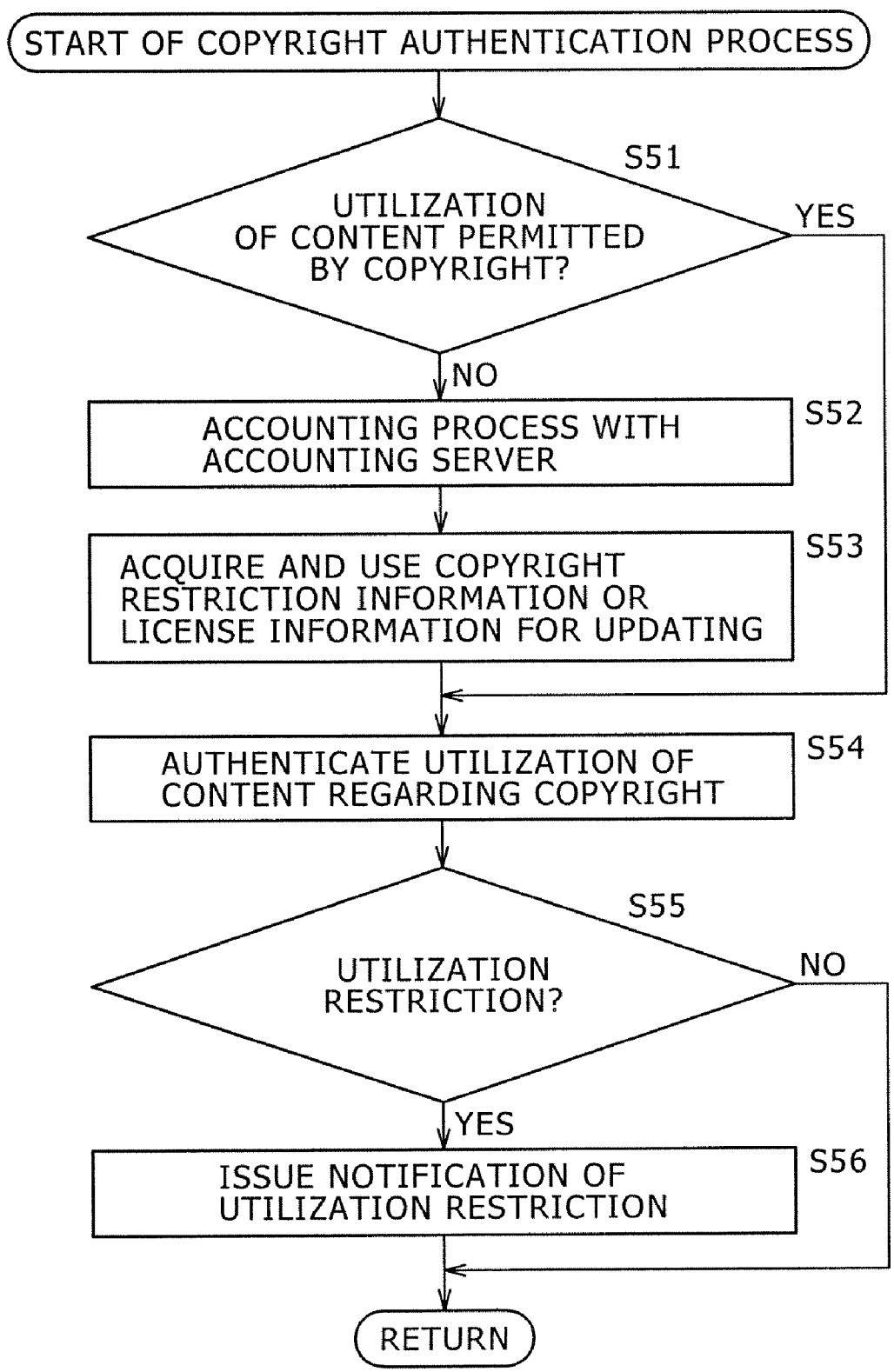
FIG. 12 is a flow chart illustrating a copyright authentication process at step S24 of FIG. 10.

Now, the copyright authentication process at step S24 of FIG. 10 is described with reference to a flow chart of FIG. 12.

At step S51, the copyright authentication section 112 decides whether or not utilization of the content is permitted in terms of the copyright based on the copyright restriction information added to the content supplied to the content playback section 25 and the license information stored in the license storage section 62 and possessed by the communication apparatus 1-1. Then, if it is decided that utilization of the content is permitted in terms of the copyright, then processes at steps S52 and S53 are skipped and the processing advances to step S54, at which utilization of the content in terms of the copyright is authenticated. Thereafter, the processing advances to step S55.

On the other hand, if it is decided at step S51 that utilization of the content is not permitted in terms of the copyright, then the processing advances to step S52, at which the copyright authentication section 112 controls the accounting processing section 114 to cooperate with the authentication server 4 to perform an accounting process for permitting utilization of the content is executed by the authentication server 4. Thereafter, the processing advances to step S53.

In particular, the accounting processing section 114 controls the session management section 81 to establish a connection to the authentication server 4 and issue a request to update the copyright restriction information of the content or the license information so that the utilization of the content may be permitted to perform an accounting process.

In response to this, the authentication server 4 transmits the new copyright restriction information or license information obtained by the accounting process to the communication apparatus 1-1.

When the copyright restriction information or the license information is received from the authentication server 4, the communication section 23 of the communication apparatus 1-1 supplies the received information to the copyright authentication section 112. At step S53, when the copyright restriction information or the license information is acquired, the copyright authentication section 112 controls the copyright information updating section 113 to update the copyright restriction information added to the content or the license information in the license storage section 62. Thereafter, the processing advances to step S54, at which utilization of the content in terms of the copyright is authenticated, and then the processing advances to step S55.

It is to be noted that, though not shown, if the accounting process is not executed or authentication from the authentication server 4 is not obtained and utilization of the content in terms of the copyright is not authenticated, then the processing returns to step S21 of FIG. 10 and it is waited that a different content is selected by the user. Thereafter, the processes at the steps following the step S21 are repetitively executed in response to selection of the different content.

Further, at step S55, the copyright authentication section 112 decides whether or not the content has some utilization restriction based on the copyright restriction information. Then, for example, if it is decided that the content has such restriction that, although playback is permitted, recording is not permitted or, although playback is permitted, the number of times of playback is restricted, then the processing advances to step S56. At step S56, the utilization restriction to the content is supplied to the notification information production section 118 through the playback authentication control section 111 so that an image for notifying the user of the utilization restriction of the content is produced by the notification information production section 118.

In particular, at step S56, after the image for notifying a user of the utilization restriction of the content is produced, the notification information production section 118 causes the display unit 41 which forms the outputting section 21 to display the produced image through the image sound synthesis section 26 so as to notify the user of the utilization restriction. Consequently, the user can recognize in advance such utilization restriction, for example, that playback is permitted but recording is not permitted, and so forth.

After the utilization restriction to the content is displayed on the display unit 41, or, if it is decided at step S55 that no utilization restriction is applied, then the copyright authentication section 112 ends the copyright authentication process, and the processing returns to step S24 of FIG. 10 and then advances to step S25. Then, at step S25, a privacy authentication process is executed by the privacy authentication section 115.

Figure 13:
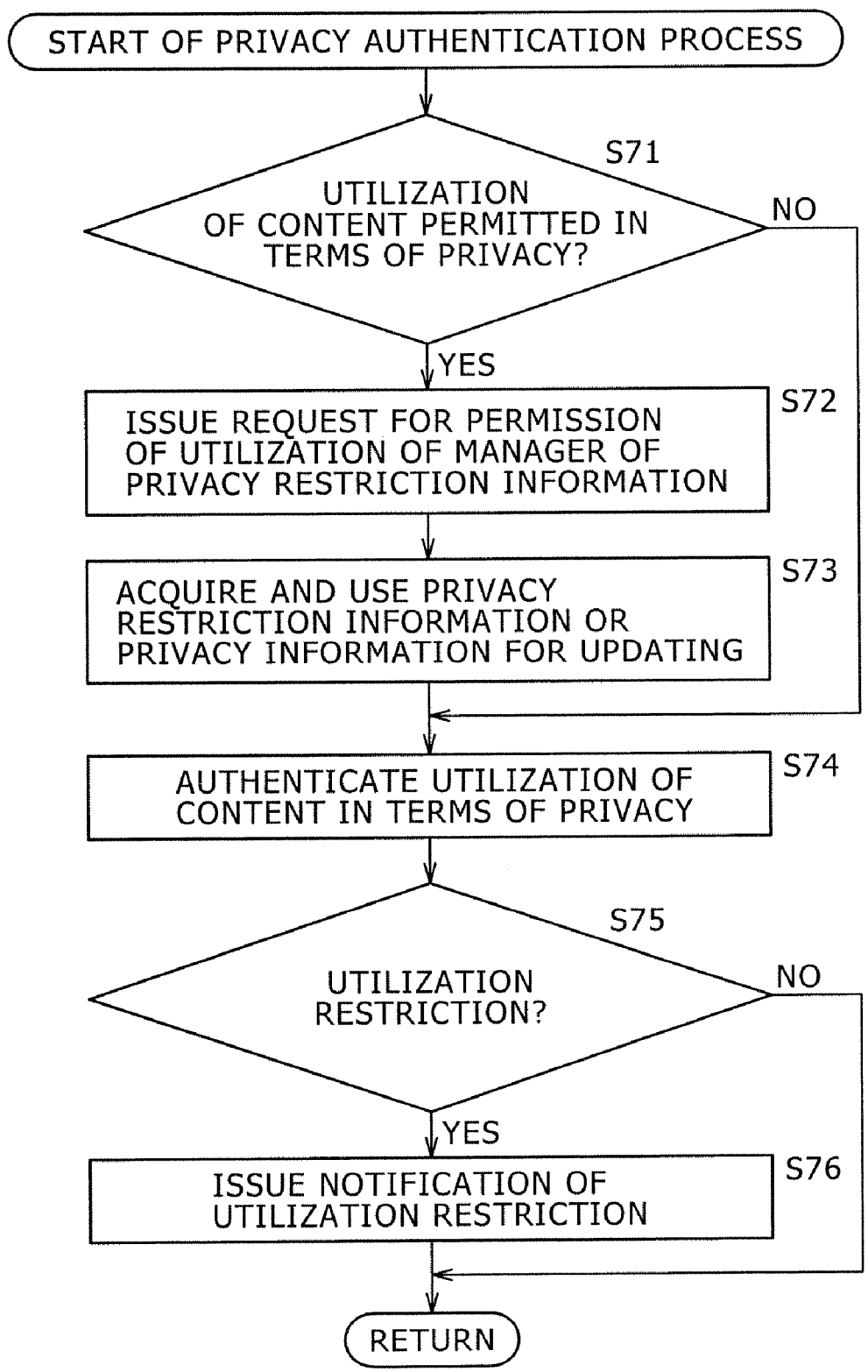
FIG. 13 is a flow chart illustrating a privacy authentication process at step S25 of FIG. 10.

Next, the privacy authentication process at step S25 of FIG. 10 is described with reference to a flow chart of FIG. 13.

At step S71, the privacy authentication section 115 decides whether or not utilization of the content is permitted in terms of the privacy (personal information) based on the privacy restriction information added to the content supplied to the content playback section 25 and the privacy information of the communication apparatus 1-1 stored in the user storage section 63. Then, if it is decided that utilization of the content is permitted in terms of the privacy, then processes at steps S72 and S73 are skipped and the processing advances to step S74, at which utilization of the content in terms of the privacy is authenticated, and then the processing advances to step S75.

On the other hand, if it is decided at step S71 that utilization of the content is not permitted in terms of the privacy, then the processing advances to step S72, at which the privacy authentication section 115 controls the permission request processing section 117 to issue a request for permission of utilization of the content to the communication apparatus 1-3 of the user C who is a manager of the privacy restriction information added to the content. Then, the processing advances to step S73.

In particular, the permission request processing section 117 controls the session management section 81 to establish a connection to the communication apparatus 1-3 and issue a request for permission of utilization of the content so that utilization of the content may be permitted. At this time, the permission request processing section 117 may issue a request to change the privacy restriction information to be added to the content or may issue a request to change the privacy information of the communication apparatus 1-1 so that the communication apparatus 1-1 can belong to a new group or level.

Corresponding to this, the user C of the communication apparatus 1-3 would operate the operation inputting section 31 to authenticate utilization of the content of the communication apparatus 1-1. In response to the operation signal from the operation inputting section 31, the viewing recording level setting section 82 changes the privacy information restriction information to new privacy information restriction information, or the session management section 81 changes the privacy information to new privacy information. Then, the changed privacy information restriction information or privacy information is transmitted to the communication apparatus 1-1 through the communication section 23.

When the privacy information restriction information or privacy information is received from the communication apparatus 1-3, the communication section 23 of the communication apparatus 1-1 supplies the received information to the privacy authentication section 115. After the privacy authentication section 115 acquires the privacy information restriction information or privacy information at step S73, it controls the copyright information updating section 113 to change the copyright restriction information added to the content or the privacy information of the user storage section 63. Thereafter, the processing advances to step S74, at which the privacy authentication section 115 authenticates utilization of the content in terms of the privacy, whereafter the processing advances to step S75.

It is to be noted that, though not shown in the drawings, if authentication from the communication apparatus 1-3 is not obtained and utilization of the content in terms of the privacy is not authenticated, then the processing returns to step S21 of FIG. 10, at which it is waited that a different content is selected by the user. Then, the processes at the steps following the step S21 are repeated in response to the selection of a different content.

The privacy authentication section 115 decides further at step S75 based on the privacy information restriction information or privacy information whether or not the content has some utilization restriction. For example, if the content has such restriction that, although playback is permitted, recording is not permitted or although playback is permitted, the number of times of playback is restricted, then the processing advances to step S76. At step S76, the privacy authentication section 115 supplies the utilization restriction to the content to the notification information production section 118 through the playback authentication control section 111 so that the notification information production section 118 may produce an image for notifying the user of the utilization restriction of the content.

In particular, at step S76, after the notification information production section 118 produces an image for notifying the user of the utilization restriction of the content, it causes the display unit 41 which forms the outputting section 21 to display the produced image through the image sound synthesis section 26 so as to notify the user of the utilization restriction of the content. Consequently, the user can recognize in advance that the content has such utilization restriction that, although playback is permitted, recording is not permitted.

After the utilization restriction of the content is displayed on the display unit 41, or when it is decided at step S75 that the content has no utilization restriction, the privacy authentication section 115 ends the copyright authentication process. Thus, the processing returns to step S25 of FIG. 10 and then advances to step S26, at which a notification process of completion of preparations for content playback to the communication apparatus 1-2 is executed by the playback authentication control section 111.

Now, the content acquisition process at step S23 of FIG. 10 is described with reference to a flow chart of FIG. 14. It is to be noted that also the content transmission process of the content supplying server 3 corresponding to this content acquisition process is described simultaneously with reference to a flow chart of FIG. 15.

Figure 14:
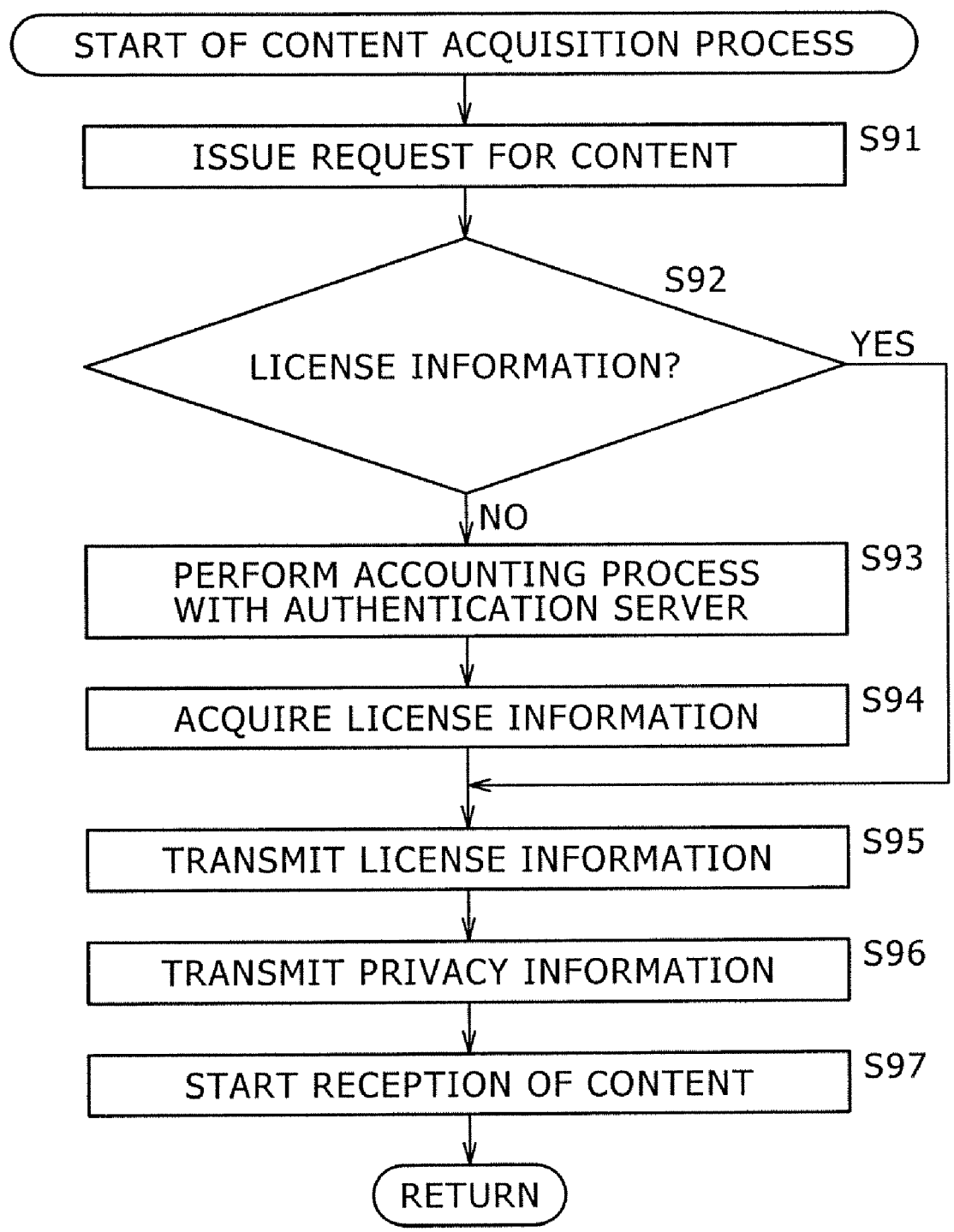
FIG. 14 is a flow chart illustrating a content acquisition process at step S23 of FIG. 10.

At step S91 of FIG. 14, the content acquisition section 119 controls the session management section 81 to issue a request for a content selected by a user to the content supplying server 3 through the communication section 23.

Figure 15:
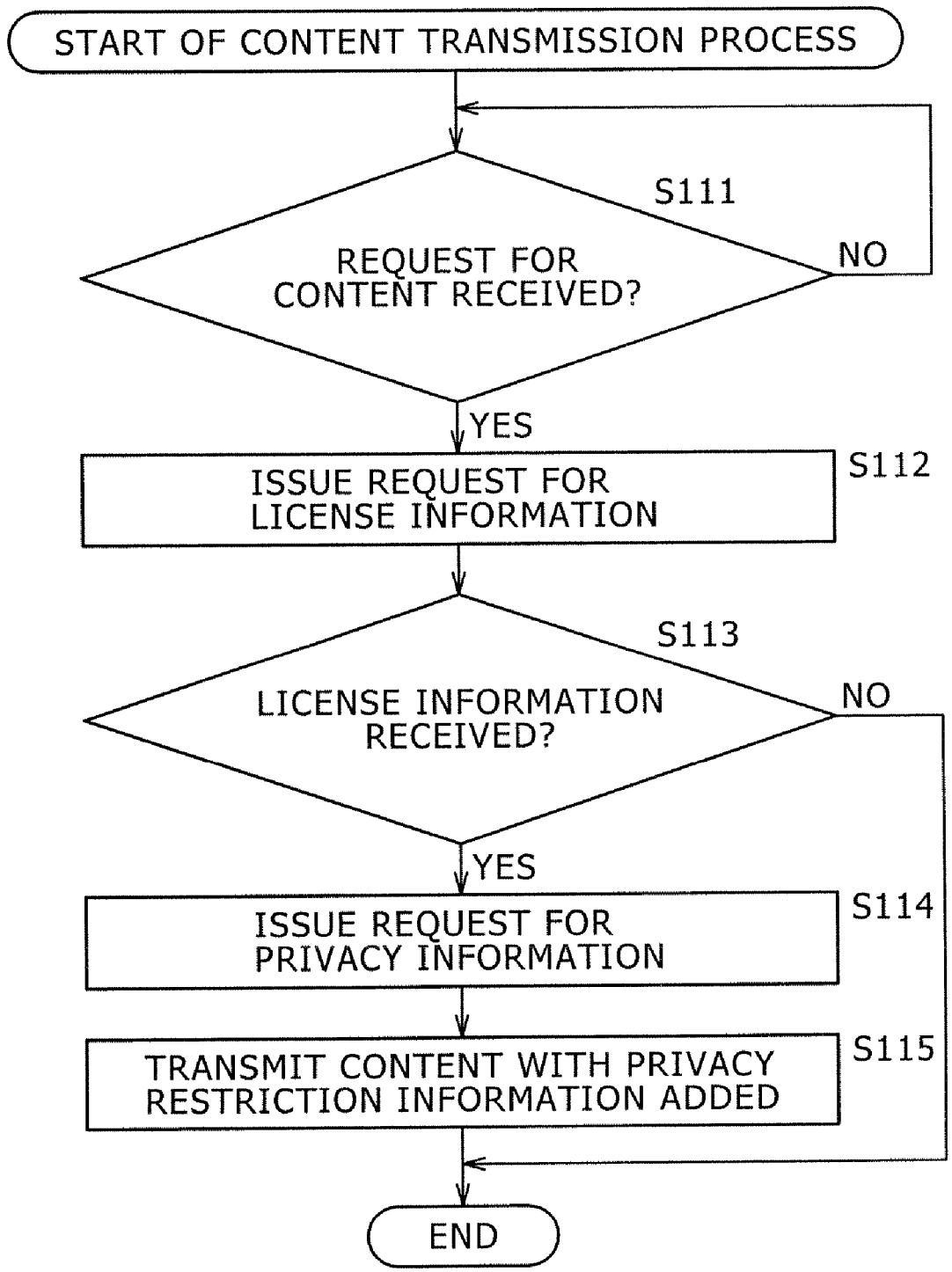
FIG. 15 is a flow chart illustrating a content transmission process executed corresponding to the process of FIG. 14.

The content supplying server 3 waits at step S111 of FIG. 15 that a request for a content is received, and when the request for the content is received from the communication apparatus 1-1, the processing advances to step S112. At step S112, the content supplying server 3 issues a request for license information regarding the requested content to the communication apparatus 1-1. Thereafter, the processing advances to step S113.

The content acquisition section 119 controls the copyright authentication section 112 at step S92 in response to the request for license information from the content supplying server 3 to decide whether or not the license information regarding the selected content is stored in the license storage section 62. If it is decided at step S92 that the license information regarding the selected content is stored, then the copyright authentication section 112 supplies the license information to the content acquisition section 119. Then, the processing advances to step S95 skipping processes at steps S93 and 94.

If it is decided at step S92 that the license information regarding the selected content is not stored, then the processing advances to step S93, at which the copyright authentication section 112 controls the accounting processing section 114 to cooperate with the authentication server 4 to perform an accounting process for allowing utilization of the content, whereafter the processing advances to step S94. In short, the accounting processing section 114 controls the session management section 81 to establish a connection to the authentication server 4 and issue a request for the license information to perform an accounting process.

In response to the request, the authentication server 4 transmits the license information obtained by the accounting process to the communication apparatus 1-1.

When the communication section 23 of the communication apparatus 1-1 receives the license information, it supplies the license information to the copyright authentication section 112. At step S94, the copyright authentication section 112 acquires the license information and supplies the license information to the copyright information updating section 113 and the content acquisition section 119. Thereafter, the processing advances to step S95. At this time, the copyright information updating section 113 stores the license information supplied thereto into the license storage section 62.

The content acquisition section 119 controls the session management section 81 at step S95 to transmit the license information supplied thereto from the copyright authentication section 112 to the content supplying server 3.

At step S113, the content supplying server 3 decides whether or not the license information is received. If it is decided that the license information is received from the communication apparatus 1-1, then the processing advances to step S114, at which the content supplying server 3 issues a request for privacy information to the communication apparatus 1-1. If it is decided at step S113 that the license information is not received, then the content supplying server 3 ends the content transmission process.

When the communication section 23 of the communication apparatus 1-1 receives the request for privacy information from the content supplying server 3, it supplies the received request for privacy information to the content acquisition section 119. When the request for privacy information is received, the content acquisition section 119 reads out, at step S96, the privacy information from the user information storage section 63 and controls the session management section 81 to transmit the privacy information to the content supplying server 3.

When the content supplying server 3 receives the privacy information from the communication apparatus 1-1, it further adds, at step S115, privacy restriction information to the content, to which copyright restriction information is added in advance, for example, by the ∘∘ TV station or the ΔΔ production, based on the privacy information of the communication apparatus 1-1. Then, the content supplying server 3 transmits the resulting content to the communication apparatus 1-1. Then, the content supplying server 3 ends the content transmission process after it completes transmission of all of such contents.

At step S97, the communication section 23 of the communication apparatus 1-1 starts reception of the content transmitted from the communication apparatus 1-1 and supplies the received content to the content playback section 25, thereby ending the content transmission process. Thereafter, the processing returns to step S23 of FIG. 10 and then advances to step S24.

It is to be noted that, though not shown in the drawings, if the accounting process is not executed or a content is not transmitted from the content supplying server 3 in the process of FIG. 14, then the processing returns to step S21 of FIG. 10, at which the communication apparatus 1-1 waits that another content is selected by the user. Then, the processes at the steps following the step S21 are repeated in response to selection of another content.

As described above, although personal enjoyment of a content within a terminal does not conventionally infringe upon the copyright or privacy information, since a communication process by which a content is similarly enjoyed personally involves intervention of a network, there is the possibility that infringement upon the copyright or privacy information may occur. In contrast, since a content of an object of simultaneous playback is authenticated in terms of both of the copyright and the privacy by each of pertaining apparatus, infringement upon the copyright and the privacy can be suppressed.

Accordingly, also in a remote communication process, a variety of contents can be used while the protection of the copyright and the privacy is promoted, and each user can further enjoy communication with another user at a remote place. Consequently, the demand for contents is expanded.

It is to be noted that the foregoing description relates to an example wherein license information of the copyright is acquired for each communication apparatus. In particular, conventional license information of the copyright basically restricts copying and transfer on a network of a content and is sold presupposing personal use of an individual.

In contrast, the present invention proposes that particular users perform synchronous playback of a common content through a network so that active communication may be achieved. It is anticipated that this gives rise to an effect of increasing the demand for contents of an object of synchronous playback. However, where conventional license information of the copyright is used, a number of package media such as optical disks or licenses equal to the number of communication apparatus for synchronously playing back a common content in remote communication must be purchased.

In particular, if a case wherein a space in which a common content is used to perform synchronous playback by particular users through a network is regarded as a single virtual content viewing space by the particular user group in accordance with the present invention is compared with another case wherein the particular users of the group gather together in a certain real content viewing space and perform viewing (in this instance, only one content utilization charge is imposed), then a comparatively high content utilization charge is imposed. This results in spoiling of the interest of users and may obstruct the effect of increase in demand for contents and the distribution of contents.

Therefore, for a content to be used for synchronous playback in remote communication (such synchronous playback is hereinafter referred to also as shared utilization. In particular, sharing in the present invention is different from conventional sharing in that it is not mere sharing of a content but signifies synchronous playback of a content), a copyright license which presupposes shared utilization but not conventional personal utilization of an individual, that is, license information which restricts utilization of a content only to shared utilization (such license information is hereinafter referred to as shared utilization license information), is produced and sold. In this instance, such shared utilization restriction information as illustrated in FIG. 16 is added to the copyright restriction information of an object content.

FIG. 16 illustrates an example of a configuration of the shared utilization restriction information to be added to a content. This shared utilization restriction information requires copyright protection which is provided by a package medium such as, for example, the optical disk 92 or from the content supplying server 3, and is added to the copyright restriction information described hereinabove with reference to FIG. 9 which is added to a content whose utilization is restricted only to the shared utilization.

In the example of FIG. 16, the shared utilization restriction information includes shared terminal number restriction information, a sharing restriction user, a sharing restriction district, sharing restriction time and so forth.

The shared terminal number restriction information is information which restricts the number of users who may synchronously play back the content (number of communication apparatus). The sharing restriction user is information which restricts an object user by which the content is to be synchronously played back, and, for example, information for identifying the personal object user, the group to which the user belongs, the privacy level and so forth are set.

The sharing restriction district is information which restricts the district in which the communication apparatus 1 by which a content is to be synchronously played back are installed. For example, in the case of a broadcast content, simultaneous playback with a communication apparatus in a country other than Japan in which the content is broadcast can be restricted. The sharing restriction period is information which restricts a term in which the content can be played back in synchronism.

Figure 17:
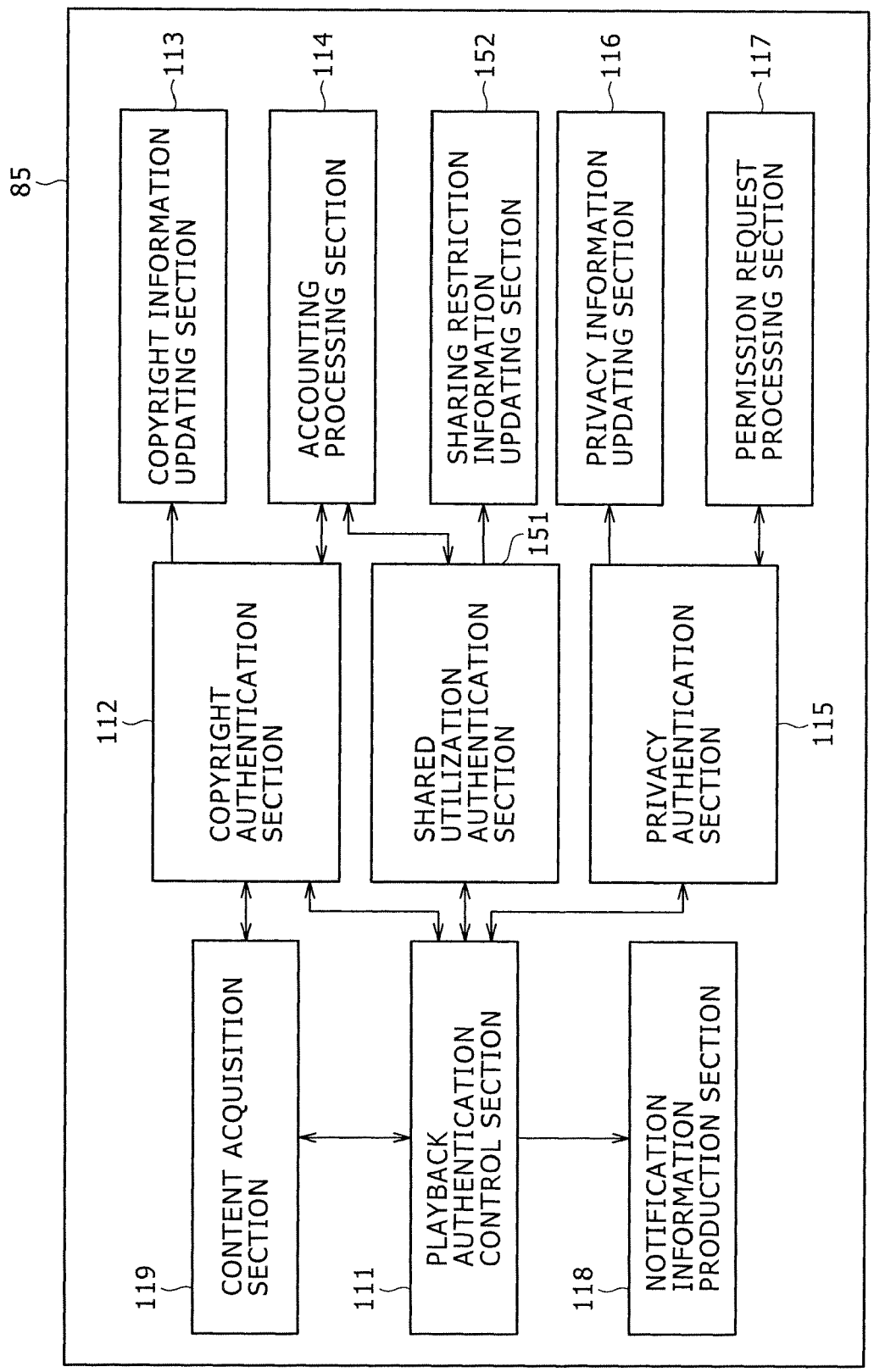
FIG. 17 is a view showing another example of the configuration of the playback permission section of FIG. 4.

FIG. 17 shows an example of a detailed configuration of the playback permission section 85 of FIG. 4 ready for the shared utilization restriction information of FIG. 16. It is to be noted that the playback permission section 85 of FIG. 17 has a configuration similar to that of the playback permission section 85 of FIG. 6 described hereinabove except that it additionally includes a shared utilization authentication section 151 and a sharing restriction information updating section 152.

The playback authentication control section 111 performs a time counting operation using a clock built therein while a content is played back in synchronism after the content utilization authentication by the copyright authentication section 112 and the privacy authentication section 115 completes. The playback authentication control section 111 controls the shared utilization authentication section 151 at predetermined intervals to execute the authentication process of the shared utilization copyright.

The shared utilization authentication section 151 acquires apparatus information of those communication apparatus (the number of apparatus, a district for the communication apparatus, group information and so forth) which currently take part in remote communication (that is, which are performing synchronous playback) from the session management section 81. Then, the shared utilization authentication section 151 decides based on the acquired apparatus information whether or not the shared utilization restriction information added to the content which is being currently played back is satisfied. Then, the shared utilization authentication section 151 controls the accounting processing section 114 and the sharing restriction information updating section 152 in response to a result of the decision to cooperate with the playback authentication control section 111 to perform an accounting process and update the shared utilization restriction information or supply a notification of rejection of authentication of the shared utilization (that is, synchronous playback) to the notification information production section 118 though the playback authentication control section 111.

The sharing restriction information updating section 152 acquires, as a result of the accounting process by the accounting processing section 114, new utilization restriction information from the authentication server 4 and updates the utilization restriction information added to the content with the acquired utilization restriction information.

Now, the authentication process of the shared utilization copyright is described with reference to a flow chart of FIG. 18. For example, the communication apparatus 1-1 and 1-2 perform an accounting process based on operations of the user A and the user X, respectively, and individually acquire shared utilization license information of the content selected at step S3 of FIG. 5.

Then, at step S3 of FIG. 5, a process similar to the content authentication process described hereinabove with reference to FIG. 10 is executed. At step S4, synchronous playback of the content by the content playback section 25 is started under the control of the playback synchronization section 83.

After the synchronous playback of the program is started, the playback authentication control section 111 performs a counting operation by means of the clock built therein at step S151 and waits that predetermined time elapses. Then, if it is decided that the predetermined time elapses, then the processing advances to step S152, at which the playback authentication control section 111 controls the shared utilization authentication section 151 to decide whether or not the shared utilization restriction information is satisfied.

In particular, the shared utilization authentication section 151 acquires, at step S152, apparatus information (district of the communication apparatus, group information and so forth) relating to the communication apparatus which take part in the remote communication at present (that is, which are playing back the content in synchronism with each other). It is to be noted that, although the session management section 81 stores, in the starting process of the remote communication at step S1 of FIG. 5, apparatus information, if the apparatus information is not stored, then the session management section 81 acquires apparatus information from the pertaining apparatus through the communication section 23 and supplies the acquired apparatus information to the shared utilization authentication section 151.

Then, the shared utilization authentication section 151 decides based on the acquired apparatus information whether or not the shared utilization restriction information added to the content being currently played back is satisfied. If it is decided that the shared utilization restriction information added to the content being currently played back is not satisfied, then the processing advances to step S153. At step S153, the shared utilization authentication section 151 supplies a notification that the shared utilization restriction information is not satisfied, that is, a notification of rejection of authentication for shared utilization, to the notification information production section 118 through the playback authentication control section 111 so that the notification information production section 118 may produce an image for notifying the user that the shared utilization restriction information is not satisfied. Thereafter, the processing advances to step S154.

After the notification information production section 118 produces an image for notifying the user that the shared utilization restriction information is not satisfied, it causes the produced image to be displayed on the display unit 41 which forms the outputting section 21 through the image sound synthesis section 26.

At step S154, the shared utilization authentication section 151 controls the accounting processing section 114 to cooperate with the authentication server 4 to execute an accounting process for satisfying the shared utilization restriction information. Thereafter, the processing advances to step S155.

Thus, the authentication server 4 transmits new shared utilization restriction information determined by the accounting process to the communication apparatus 1-1. The communication section 23 of the communication apparatus 1-1 receives the shared utilization restriction information and supplies it to the shared utilization authentication section 151.

At step S155, the shared utilization authentication section 151 acquires the shared utilization restriction information and controls the sharing restriction information updating section 152 to update the shared utilization restriction information added to the content with the acquired shared utilization restriction information. Then, the shared utilization authentication section 151 ends the authentication process for the shared utilization copyright. It is to be noted that, when the accounting process or the like is not executed, naturally the synchronous playback of the content is ended compulsorily.

On the other hand, if it is decided at step S152 that the shared utilization restriction information added to the content being currently played back is not satisfied, then since there is no problem with regard to the copyright for the shared utilization, the shared utilization authentication section 151 ends the authentication process for the shared utilization copyright.

As described above, when a content is being played back in synchronism in the remote communication process, the shared utilization restriction information added to the content is confirmed periodically to decide whether or not the shared utilization is authenticated. Therefore, it can be suppressed that the content is played back in synchronism while a license for shared utilization is infringed upon.

Accordingly, for example, if a request to newly take part in a remote communication process exceeding shared utilization restriction of the shared utilization restriction information is issued, then a notification of the shared utilization restriction information is issued or an accounting process to the authentication server 4 for increasing the restricted number of members is executed.

Figure 18:
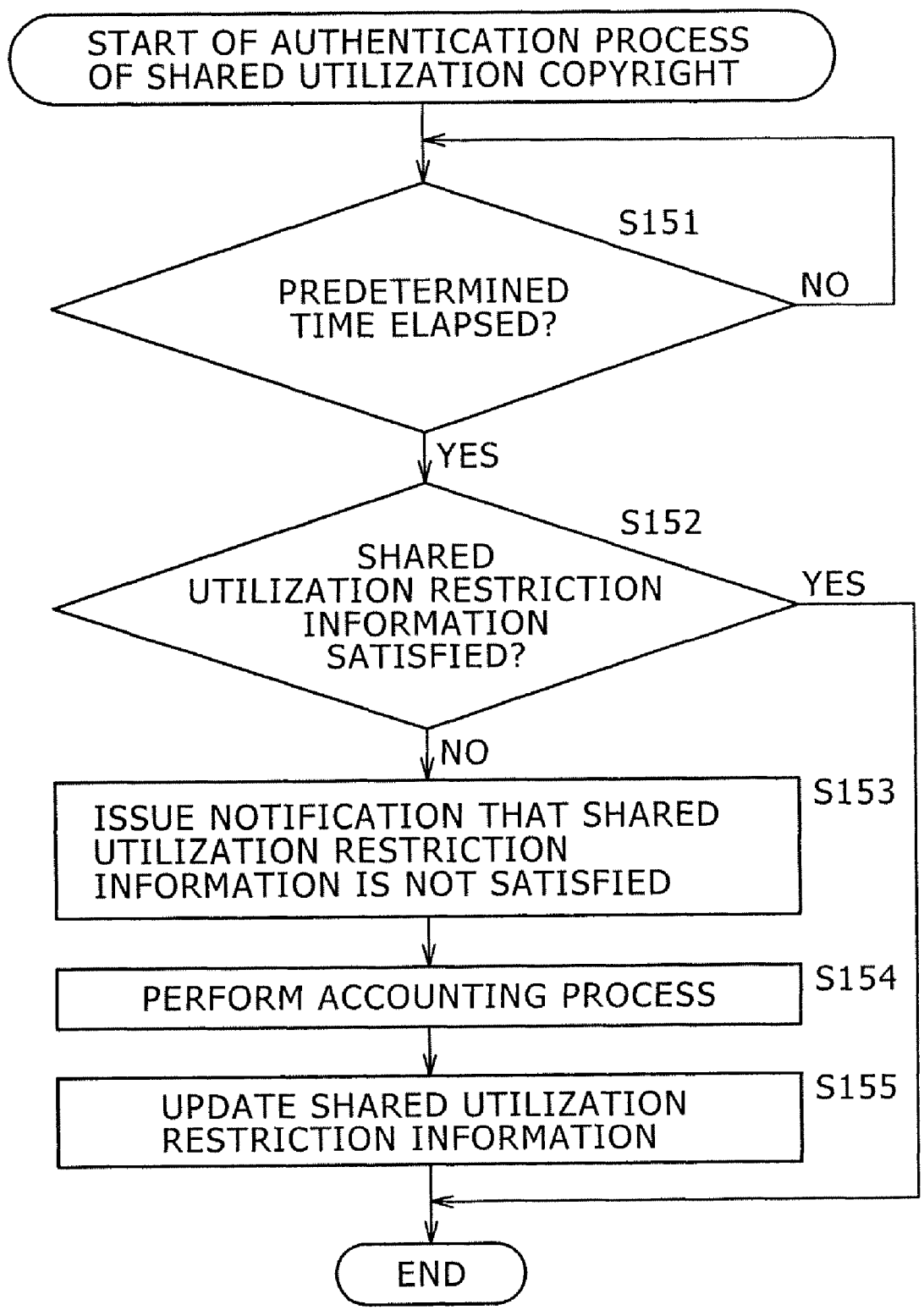
FIG. 18 is a flow chart illustrating a shared utilization copyright authentication process of the playback permission section of FIG. 17.

It is to be noted that, while, in FIG. 18, the authentication process for the shared utilization copyright is performed while a content is being played back in synchronism, the authentication process may be executed otherwise in the content utilization authentication process at step S3 of FIG. 5 before the synchronous playback of the content is started.

Further, the process described above may be executed by at least one of those communication apparatus by which the remote communication process (that is, the synchronous playback of the content) is being performed. Furthermore, the process described above may be implemented on the authentication server 4.

As described above, in the present invention, since the remote communication process is executed, communication which is more active and natural than that by a conventional remote place communication apparatus such as a voice telephone set, a visual telephone set or a video conference system.

In particular, in a conventional system, when the user X who views a broadcast content distributed on the real-time basis on a conventional TV apparatus uses a voice telephone set to convey its impressions upon viewing the broadcast content to the user A at a remote place, it is sometimes difficult for the user A, who does not actually view the content, to understand the situation.

However, where the communication apparatus of the present invention is used, the user A and the user X at remote places can share the same content at the same point of time. Further, since also the image and sound of the opposite party is played back simultaneously on a small screen or the like, the user A and the user X can have such a feeling of being at the same place, a sense of togetherness or a sense of intimacy as are had when they communicate with each other sitting face to face with each other although they are at remote places.

Further, in this instance, even if a content requires copyright protection or privacy protection, since authentication regarding the copyright and privacy information is performed without fail before synchronous playback is entered, infringement upon the copyright and the privacy of the content is suppressed. Further, a great variety of contents can be played back in synchronism and enjoyed. Consequently, an effect that the demand for contents is expanded can be achieved.

Furthermore, since copyright license information which presupposes shared utilization (which allows synchronous playback by a plurality of persons on a network) is used, a provider of contents can expand, in the case of shared utilization, the range of business by setting the price lower than that in licenses directed for personal utilization or the like. Further, an effect that the interest of customers who hesitate to utilize contents because of increase of the cost required for acquisition of a license is promoted and as a result the demand for contents expands can be achieved.

While the series of processes described above can be executed by hardware, it may otherwise be executed by software. In this instance, for example, the communication apparatus 1-1 to 1-3, content supplying server 3 and authentication server 4 of FIG. 1 are formed from such a personal computer 401 as shown in FIG. 19.

Referring to FIG. 19, a CPU (Central Processing Unit) 411 executes various processes in accordance with a program stored in a ROM (Read Only Memory) 412 or a program loaded from a storage section 418 into a RAM (Random Access Memory) 413. Also data necessary for the CPU 411 to execute the various processes are suitably stored into the RAM 413.

The CPU 411, ROM 412 and RAM 413 are connected to one another by a bus 414. Also an input/output interface 415 is connected to the bus 414.

An inputting section 416 including a keyboard, a mouse and so forth, an outputting section 417 including a display unit which may be a CRT (Cathode Ray Tube), an LCD (Liquid Crystal Display) unit or the like, a loudspeaker and so forth, a storage section 418 formed from a hard disk or the like, a communication section 419 including a modem, a terminal adapter and so forth are connected to the input/output interface 415. The communication section 419 performs a communication process through a network such as a radio network.

As occasion demands, a drive 420 is connected to the input/output interface 415. A magnetic disk 421, an optical disk 422, a magneto-optical disk 423, a semiconductor memory 424 or the like is suitably loaded into the drive 141, and a computer program read from the loaded medium is installed into the storage section 418 as occasion demands.

Where the series of processes is executed by software, a program which constructs the software is installed from a network or a recording medium into a computer incorporated in hardware for exclusive use or, for example, a personal computer for universal use which can execute various functions by installing various programs.

The recording medium is formed as a package medium such as, as shown in FIG. 19, a magnetic disc 421 (including a flexible disc), an optical disc 422 (including a CD-ROM (Compact Disc-Read Only Memory) and a DVD (Digital Versatile Disc)), or a magneto-optical disc 18 (including an MD (Mini Disc)™), or a semiconductor memory 424 which has the program recorded thereon or therein and is distributed to provide the program to a user separately from an apparatus body. Else, the recording medium is formed as a ROM 412, a hard disc included in the storage section 418 or the like in which the program is recorded and which is provided to a user in a state wherein the program is incorporated in an apparatus body.

It is to be noted that, in the present specification, the steps indicated in the flow charts may be but need not necessarily be processed in a time series in the order as described, and include processes which are executed in parallel or individually without being processed in a time series.

Further, in the present specification, the term system is used to represent an entire apparatus composed of a plurality of devices or apparatus.

The invention claimed is:

1. An information processing apparatus which communicates with different information processing apparatuses connected thereto through a network, comprising:
   a first decision section configured to decide, based on copyright restriction information from an authentication server included in content data, whether or not utilization of the content data is permitted;
   a second decision section configured to decide, based on personal restriction information including a privacy level of the information processing apparatus relative to a sharing group to which the information processing apparatus belongs and included in the content data by one of the different information processing apparatuses other than the authentication server, whether or not utilization of the content data is permitted;
   a sharing decision section configured to decide whether or not utilization of the content data is permitted based on a comparison between shared terminal number restriction information of sharing restriction information included in the content data and a number of the different information processing apparatuses performing synchronous playback with the information processing apparatus; and
   a synchronous playback section configured to play back, when it is decided by said first, second, and sharing decision sections that utilization of the content data is permitted, the content data in synchronism with the different information processing apparatuses.

2. The information processing apparatus according to claim 1, further comprising:
   a notification control section configured to control, where a utilization restriction is applied to utilization of the content data by said first utilization decision section based on the copyright restriction information, by said second utilization decision section based on the personal information restriction information, or by said sharing utilization decision section based on the sharing restriction information, notification of the utilization restriction.

3. The information processing apparatus according to claim 1, further comprising:
   a recording control section configured to control recording of the content data based on the copyright restriction information and the personal information restriction information.

4. The information processing apparatus according to claim 1, further comprising:
   a reception section configured to receive sound and images from the other information processing apparatuses; and
   a synthesis section configured to synthesize a sound and an image of the content data played back in synchronism by said playback section and the sound and the image of the user received by said reception section.

5. An information processing method for an information processing apparatus which communicates with different information processing apparatuses connected thereto through a network, comprising:
   a first decision step of deciding, based on copyright restriction information from an authentication server included in content data, whether or not utilization of the content data is permitted;
   a second decision step of deciding, based on personal restriction information including a privacy level of the information processing apparatus relative to a sharing group to which the information processing apparatus belong and included in the content data by one of the different information processing apparatuses other than the authentication server, whether or not utilization of the content data is permitted;
   a sharing utilization decision step of deciding whether or not utilization of the content data is permitted based on a comparison between shared terminal number restriction information of sharing restriction information included in the content data and a number of the different information processing apparatuses performing synchronous playback with the information processing apparatus; and
   a synchronous playback step of playing back, when it is decided by the processes at the first, second, and sharing utilization decision steps that utilization of the content data is permitted, the content data in synchronism with the different information processing apparatuses.

6. A non-transitory computer readable storage medium storing computer-readable instructions thereon that, when executed by a processor of an information processing apparatus, causes the processor to execute a process for communicating with information processing apparatuses through a network, the process comprising:
   deciding, based on copyright restriction from an authentication server information included in content data, whether or not utilization of the content data is permitted;
   deciding, based on personal restriction information including a privacy level of the information processing apparatus relative to a sharing group to which the information processing apparatus belong and included in the content data by another information processing apparatus other than the authentication server, whether or not utilization of the content data is permitted;
   a sharing utilization decision step of deciding whether or not utilization of the content data is permitted based on a comparison between shared terminal number restriction information of sharing restriction information included in the content data and a number of the different information processing apparatuses performing synchronous playback with the information processing apparatus; and a synchronous playback step of playing back, when it is decided by the processes at the first, second, and sharing utilization decision steps that utilization of the content data is permitted, the content data in synchronism with the different information processing apparatuses.

7. The information processing apparatus according to claim 1, wherein
the sharing restriction information includes a sharing terminal number restriction, a sharing group identity restriction, a sharing district restriction, and a sharing time restriction and
the apparatus information related to the different information processing apparatuses further includes a group identity of each of the different information processing apparatuses and a geographical district of each of the different information processing apparatuses.

8. The information processing apparatus according to claim 1, further comprising:
a permission request processing section configured to, when personal information related to the information processing apparatus does not satisfy the personal restriction information, request utilization of the content data from a management user of the personal restriction information.

9. The information processing apparatus according to claim 1, further comprising:
an accounting processing section configured to, when the number of the different information processing apparatuses communicating with the information processing apparatus is greater than a number permitted by the sharing restriction information, perform an accounting process and update the sharing restriction information.

10. The information processing apparatus according to claim 4, wherein the image of the user is superimposed on the image of the content data.

11. The information processing apparatus according to claim 1, wherein the information processing apparatus is registered in at least two groups and the personal restriction information includes a privacy level for each of the at least two groups.

12. The information processing apparatus according to claim 11, wherein the privacy level is different for each of the at least two groups.

13. The information processing apparatus according to claim 12, wherein each privacy level is set to one of a predetermined range of privacy levels.

* * * * *